US010201195B1

(12) United States Patent
Khaliuta et al.

(10) Patent No.: US 10,201,195 B1
(45) Date of Patent: Feb. 12, 2019

(54) HEATING SYSTEM FOR HEATED CLOTHING

(71) Applicant: CYBERX Engineering Inc., Wilmington, DE (US)

(72) Inventors: Kirill Khaliuta, Saint Petersburg (RU); Sergei Belov, Saint Petersburg (RU); Stanislav Komissarov, Saint Petersburg (RU); Timofei Kotsiubinskii, Saint Petersburg (RU); Dmitrii Danilov, Saint Petersburg (RU); Oksana Temirbekova, Saint Petersburg (RU)

(73) Assignee: CYBERX ENGINEERING INC., Wilmington, DE (US)

( * ) Notice: Subject to any disclaimer, the term of this patent is extended or adjusted under 35 U.S.C. 154(b) by 0 days.

(21) Appl. No.: 16/003,211

(22) Filed: Jun. 8, 2018

(51) Int. Cl.
| | |
|---|---|
| *A41D 13/005* | (2006.01) |
| *H05B 1/02* | (2006.01) |
| *H05B 3/34* | (2006.01) |
| *G01P 15/14* | (2013.01) |
| *A41D 1/00* | (2018.01) |
| *A41D 3/00* | (2006.01) |
| *H04B 15/02* | (2006.01) |
| *H04Q 9/02* | (2006.01) |
| *G06F 3/0488* | (2013.01) |

(52) U.S. Cl.
CPC ......... *A41D 13/0051* (2013.01); *A41D 1/002* (2013.01); *A41D 3/00* (2013.01); *G01P 15/14* (2013.01); *H04B 15/02* (2013.01); *H04Q 9/02* (2013.01); *H05B 1/0272* (2013.01); *A41D 2400/12* (2013.01); *G06F 3/0488* (2013.01); *H04Q 2213/08* (2013.01); *H05B 2203/036* (2013.01)

(58) Field of Classification Search
None
See application file for complete search history.

(56) References Cited

U.S. PATENT DOCUMENTS

| 5,032,705 A | * | 7/1991 | Batcheller | .......... | A41D 13/0051 219/211 |
| 5,105,067 A | * | 4/1992 | Brekkestran | ....... | G05D 23/2401 2/69 |

(Continued)

FOREIGN PATENT DOCUMENTS

RU          153913 U1     8/2015

*Primary Examiner* — Joseph M Pelham
(74) *Attorney, Agent, or Firm* — Georgiy L. Khayet

(57) ABSTRACT

Methods and systems for heating of heated clothing are provided. An example system may include system comprising one or more heating components placed within one or more zones of the heated clothing and configured to receive electrical current from one or more voltage converters independently. The system may also include a battery configured to provide power to the voltage converters. The system may also include a controller configured to control an output voltage of the one or more voltage converters, wherein the output voltage is provided to the one or more heating components. The controller may be configured to receive temperatures from the temperature sensors located in heating components, an ambient temperature from the ambient temperature sensor, and user-defined temperatures. The controller may adjust the output voltage based on the temperatures received from the temperature sensors and adjust ambient temperature and user-defined temperatures.

20 Claims, 19 Drawing Sheets

(56) References Cited

U.S. PATENT DOCUMENTS

| | | | |
|---|---|---|---|
| 5,193,669 A * | 3/1993 | Demeo | H01H 13/7006 200/302.2 |
| 8,008,606 B2 * | 8/2011 | Kaiserman | A43B 7/04 219/211 |
| 8,212,185 B1 | 7/2012 | Barron | |
| 2006/0060576 A1 * | 3/2006 | Haas | A41D 13/0051 219/543 |
| 2006/0280948 A1 * | 12/2006 | Moreshead | B32B 5/024 428/411.1 |
| 2011/0127248 A1 * | 6/2011 | Moreshead | D03D 1/0076 219/209 |
| 2011/0128686 A1 * | 6/2011 | Moreshead | D03D 1/0076 361/679.01 |
| 2011/0130813 A1 * | 6/2011 | Moreshead | A61F 13/00051 607/112 |
| 2012/0091115 A1 * | 4/2012 | Mironichev | H02J 7/0014 219/211 |
| 2012/0228279 A1 * | 9/2012 | Haas | A41D 13/0051 219/211 |
| 2013/0001212 A1 * | 1/2013 | Mangoubi | H05B 1/0272 219/211 |
| 2014/0246416 A1 | 9/2014 | White | |
| 2015/0230524 A1 * | 8/2015 | Stevens | A41D 13/0051 219/211 |
| 2015/0263377 A1 | 9/2015 | Brooks et al. | |
| 2015/0333572 A1 * | 11/2015 | Leabman | A41D 1/002 320/108 |
| 2017/0158898 A1 * | 6/2017 | Xiao | C09D 11/52 |
| 2017/0172227 A1 * | 6/2017 | Fan | A41D 31/0038 |
| 2017/0332442 A1 | 11/2017 | Strecker | |

* cited by examiner

HEATING SYSTEM FOR HEATED CLOTHING

TECHNICAL FIELD

This disclosure generally relates to heated clothing. More specifically, this disclosure relates to systems and methods for heating heated clothing.

BACKGROUND

Heated clothing can be used in sport activities, outdoor activities, and while performing outdoor work in a cold weather. Currently, multiple electrically-heated clothing items are available on market, including heated trousers, heated pants, heated jackets, heated gloves, heated vests, and others. One disadvantage of existing electrically-heated clothing includes lack of control or insufficient control over the temperature of the heating elements, which may cause discomfort to a user or even burns in some cases. Another disadvantage of the current electrically-heated clothing is causing high electromagnetic interference.

SUMMARY

This section introduces a selection of concepts in a simplified form that are further described in the Detailed Description section, below. This summary does not identify key or essential features of the claimed subject matter and is not intended to be an aid in determining the scope of the claimed subject matter.

This disclosure is generally concerned with systems and method for heating heated clothing. The present technology may provide control of temperature of heated clothing based on user input, variations in an ambient temperature, changes in physical activities of a user wearing the heated clothing. The heated clothing may include one or more heating zones. The heating zones can be heated and controlled independently of each other. The present technology may also provide a protection from overheating of heating elements of the heated clothing. Below are some embodiments of the present disclosure, while other embodiments should be evident from the following detailed description of example embodiments, claims, and accompanying drawings.

According to one embodiment of this disclosure, there is provided a heating system for heated clothing. An example heating system may include one or more heating components placed within one or more zones of the heated clothing. The heating components can be configured to be independently connected to one or more voltage converters to receive an electrical current. The heating system may further include a battery configured to provide power to the voltage converters. The heating system may further include a controller. The controller can be configured to connect or disconnect the one or more heating components and the one or more voltage converters. The controller can be further configured to adjust an output voltage of the one or more voltage converters, the output voltage provided to the one or more heating components, and by so to regulate temperatures of the heating components.

The temperatures of the heating components can be regulated independently of each other. The heating components can be connected or disconnected from the one or more voltage converters independently of each other.

The battery can be a flexible battery placed within the heated clothing. The heating component may include a heating element to convert the electrical current to heat. The heating element may include a copper wiring. The heating component may further include a temperature sensor configured to sense the temperature of the heating component. The heating component may include a power switch communicatively coupled to the temperature sensor. The power switch can be configured to receive, from the temperature sensor, an indication that the temperature exceeds a pre-determined temperature threshold. In response to the indication, the power switch can disconnect the heating component and the voltage converters.

The heating components can be carried out as flexible printed circuit boards (PCB). The flexible PCB may include a flexible basement made of a polyamide.

The power switch and the temperature sensor can be connected using an inter-integrated circuit bus. The power switch may include a multichannel metal oxide semiconductor transistor.

The heating system may further include an ambient temperature sensor placed within the heating clothing and configured to sense an ambient temperature. The controller can be configured to receive, from the ambient temperature sensor, the ambient temperature.

The system may further include an input device communicatively coupled to the controller. The controller can be configured to receive, via the input device, a user-defined temperature for one or more heating components. The input device may include a touchscreen input device placed within the heated clothing. The input device may include a mobile device connected to the controller by a wireless communication protocol.

The controller may be further configured to receive, from the temperature sensor of the one or more heating components, the temperature of the one or more heating components. The controller can be further configured to adjust the output voltage of the voltage converters based on the ambient temperature, the user-defined temperature, and the temperature of one or more heating components. The controller may include one or more proportional-integral-derivative controllers configured to adjust the output voltage of the one or more voltage converters.

The power switch can be further configured to determine that a current flowing through the one or more heating controllers exceeds a pre-determined current threshold. In response to the determination, the power switch may disconnect the one or more heating components and the one or more voltage converters.

The controller can be further configured to estimate a resistance of the one or more heating components. The controller can be further configured to calculate, based on the resistance, an integral temperature of the one or more heating components. The controller can be further configured to determine that the integral temperature does not exceed the pre-determined threshold. In response to the determination, the controller may configure the power switch to connect the one or more heating components and the one or more voltage converters.

The controller can be further configured to determine that the resistance of the one or more heating components is outside a pre-determined tolerance range or the electrical current flowing through the one or more heating components exceeds a pre-determined maximum value. Based on the determination, the controller may disconnect the one or more heating components and the one or more voltage converters.

The system may further include a proximity sensor placed within the heated clothing. The controller can be further configured to receive proximity data from the proximity sensor. The controller may determine, based on the proximity data, that the heated clothing is not worn by a user. In response to the determination, the controller may set the output voltage of the one or more voltage converters to a pre-determined minimum value to conserve power of the battery.

The heating components may further include an accelerometer and a gyroscope. The accelerometer and gyroscope can be communicatively connected to the controller. The controller can be further configured to receive accelerometer data from the accelerometer and gyroscope data from the gyroscope and determine, based on the accelerometer data and gyroscope data, a level of activity of a user. The controller may adjust, based on the level of activity of the user, the output voltage of the one or more voltage converters.

The voltage converters may include a synchronous step-down converter to regulate the output voltage provided to the one or more heating components. The heating components can be positioned to cover substantially muscles of a user when the user wears the heated clothing.

According to another embodiment of this disclosure, a method for heating heated clothing is provided. An example method may include receiving, by a controller and via temperature sensors of one or more heating components, temperatures of the one or more heating components. The heating components can be placed within one or more zones of the heated clothing and powered independently by one or more of voltage converters. The voltage converters can be powered by a battery. The method may further include receiving, by a controller and via an ambient temperature sensor, an ambient temperature. The method may further include receiving, by the controller and via an input device, user-defined temperatures for the one or more heating components. The method may further include adjusting, by the controller, and based on the temperatures of the one or more heating components, the ambient temperature and the user-defined temperatures, an output voltage of the voltage converters, wherein the output voltage is provided to the one or more heating components.

The method may include receiving, by power switches from the temperature sensors of the one or more heating components, indications that the temperature of the one or more heating components exceeds a predetermined maximum threshold. In response to the indications, method may proceed with disconnecting, by the power switches, one or more heating components and one or more voltage converters.

The method may further include, estimating, by the controller, resistances of the one or more heating components. The method may include calculating, based on the resistances, integral temperatures of the one or more heating components. The method may further include determining, by the controller, that the integral temperatures do not exceed the pre-determined threshold. In response to the determination, the method may include configuring the power switches to connect the one or more heating components and the one or more voltage converters.

The method may also include determining that the resistance of the one or more heating components is outside a pre-defined tolerance range. The method may further include, in response to the determination, disconnect the one or more heating components and the one or more voltage converters.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION OF EXAMPLE EMBODIMENTS

Figure 1:
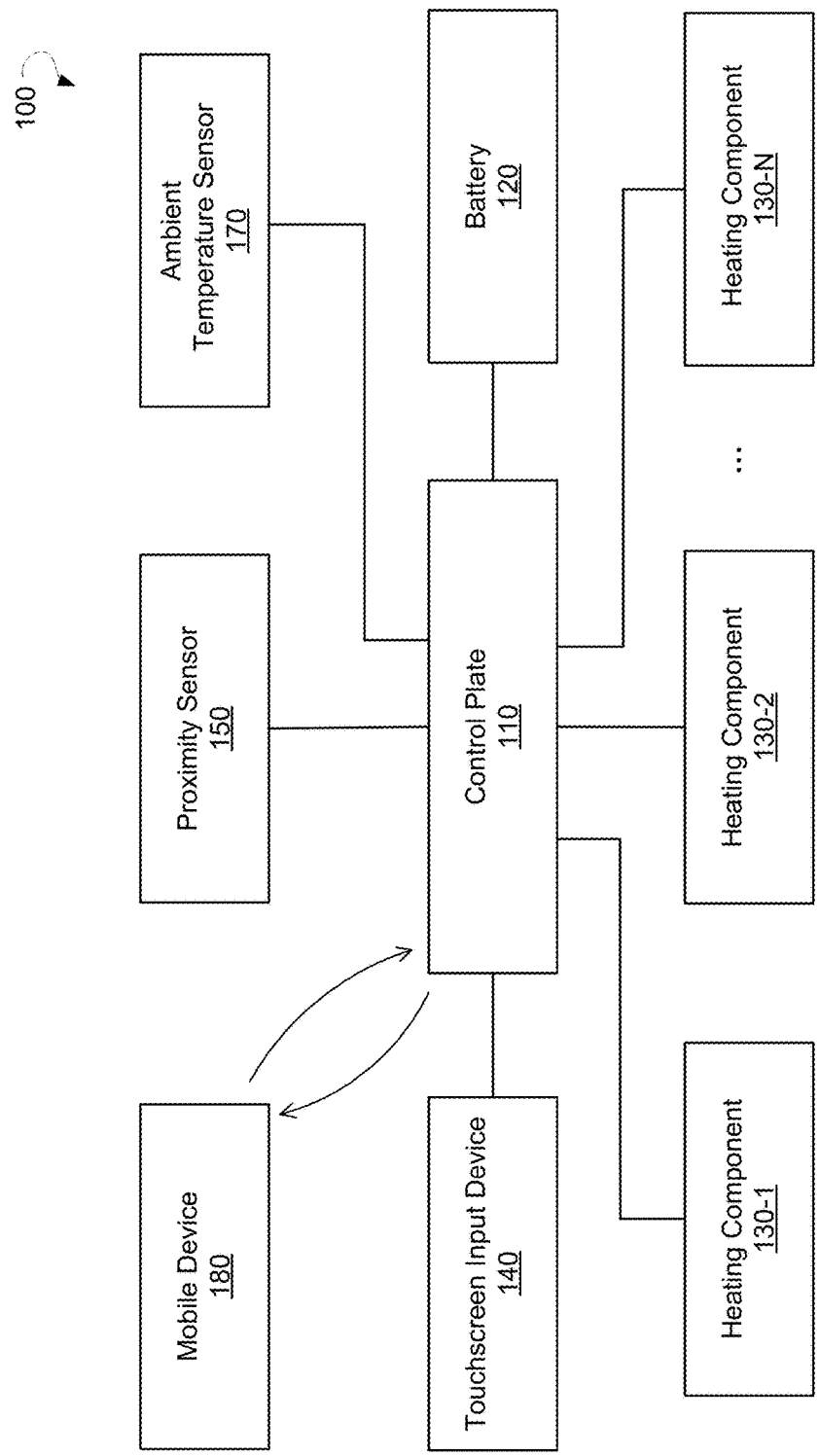
FIG. 1 is a block diagram of a heating system for heated clothing, according to some example embodiment of the present disclosure.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Embodiments of this disclosure are concerned with systems and methods for heating heated clothing. The methods and systems of this disclosure may provide an improved control of temperature of heating components in different zones of heated clothing. The temperature of a heating component can be controlled locally by elements of the heating component and by a central control plate of the heated clothing. The present technology may provide control of temperature of heating components based on variation of an ambient temperature and changes of physical activities of a user wearing the heated clothing. The heating components can be powered independently of each other. The temperatures of the heating elements can be regulated independently of each other. The present technology may also provide protection of the user from unexpected burns caused by overheating of the heated clothing. The present technology may also provide diagnostics for conditions of the heating components of the heated clothing. Furthermore, the present technology may also provide reduction in electromagnetic interference which may be caused by electrical components of heated clothing.

According to an example embodiment, a heating system for heated clothing may include one or more heating components placed within one or more zones of the heated clothing. The heating components can be configured to independently receive electrical current from one or more voltage converters located at a control plate. The heating system may include battery configured to provide power to the one or more voltage converters. The system may also include a controller configured to control an output voltage of the one or more voltage converters. The output voltage can be provided to the one or more heating components.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 is a block diagram of a heating system 100 for heated clothing, according to some example embodiment of the present disclosure. The heating system 100 may include a control plate 110, a battery 120, one or more heating components 130-$i$ ($i=1, \ldots, N$), a touchscreen input device 140, a proximity sensor 150, and an ambient temperature sensor 170.

The heating system 100 may also include a mobile device 180. The mobile device 180 can be communicatively coupled with the control plate 110 by a wireless communication protocol, such as Bluetooth™. The mobile device 180 may include a smartphone, a tablet computer, a smart watch and the like.

The heating system 100 may be installed in various type of heated clothing, including but not limited to jackets, pants, footwear, gloves, and the like. Number, size, shape and resistance of heating components may be different based on the type of the heated clothing. Locations of the battery 120, the control plate 110, the heating elements, and other components of the heating system 100 may also depend on type of heated clothing. In some embodiments, the battery 120 can be rigidly placed within the heated clothing. In other embodiments, the battery 120 may include an external battery located outside of the heating clothing. In such embodiments, the heating clothing may include special electrical contacts for connecting, via wires, to the external battery. In further embodiments, the battery 120 can be configured to be removable and attachable to the heated clothing. The heating components 130-$i$ ($i=1, \ldots, N$) may be placed in clothing in a such way, that when a user wears the clothing the heating components are heating substantially muscles of the user.

The proximity sensor 150 may include a capacitive proximity sensor. The proximity sensor 150 can be configured to detect whether the heated clothing touches a body of the user.

The touchscreen input device 140 can be placed on top of the heated clothing to be conveniently access by the user. The touchscreen input device 140 can be communicatively coupled with the control plate 110. The user may use the touchscreen input device 140 to monitor temperatures of heating component 130-$i$ ($i=1, \ldots, N$). The user may also provide, using the touchscreen input device 140, desired user-defined temperature the temperatures of heating components 130-$i$ ($i=1, \ldots, N$). In addition, the user may monitor temperatures of heating components 130-$i$ j($i=1, \ldots, N$) and provide desired user-defined temperatures for the heating components using the mobile device 180.

Figure 2:
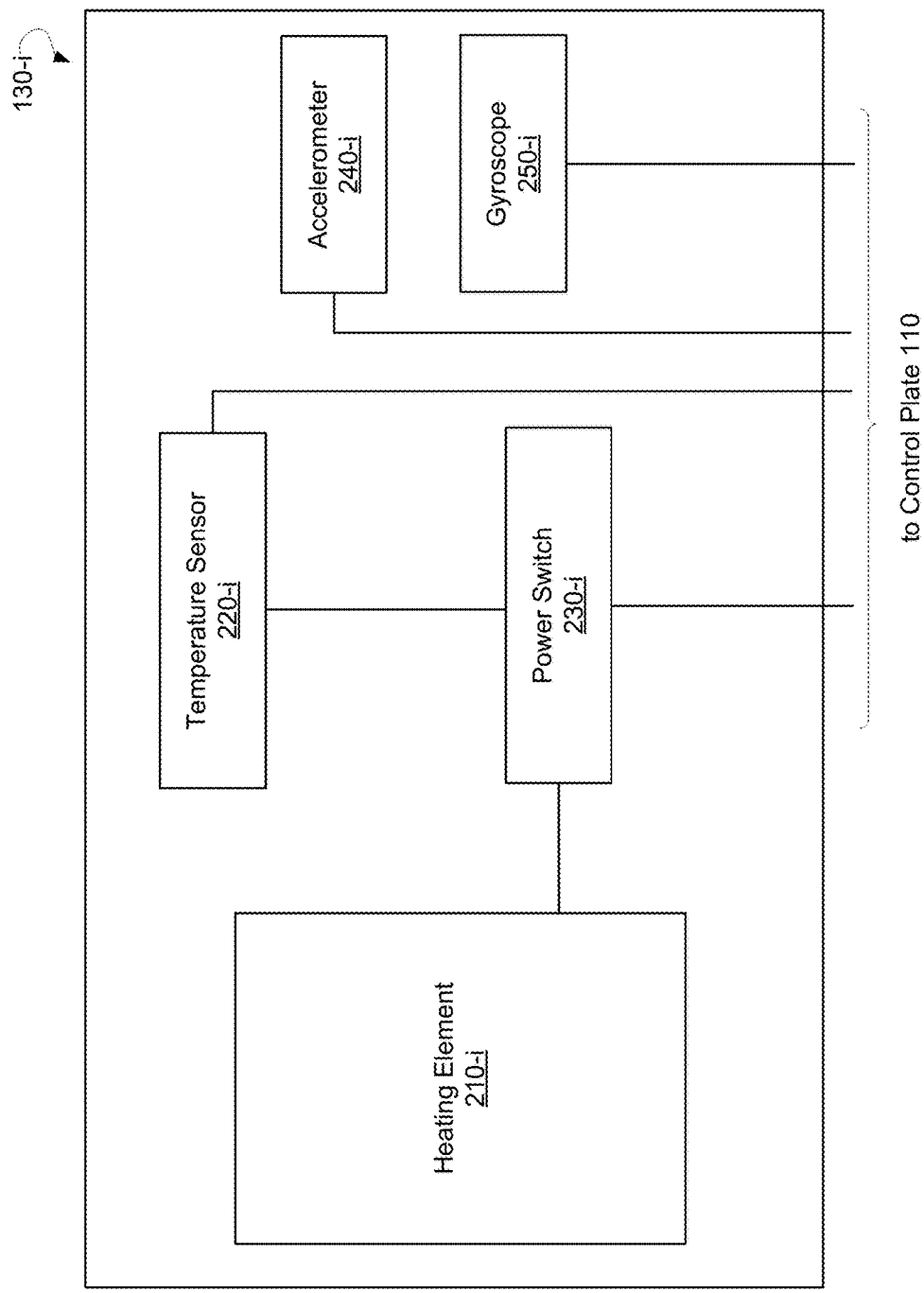
FIG. 2 is a block diagram of a heating component, according to some example embodiments of the present disclosure.

FIG. 2 is a block diagram of heating components 130-$i$ ($i=1, \ldots, N$), according to example embodiments of the present disclosure. The heating components 130-$i$ ($i=1, \ldots, N$) may include a heating element 210-$i$, a temperature sensor 220-$i$, a power switch 230-$i$, an accelerometer 240-$i$, and a gyroscope 250-$i$. The heating element 210-$i$ may include a copper conductor. The thickness of the copper conductor can be 35 micrometers. The heating component 350-$i$ may also include buses for providing power and signals to the heating element 210-$i$, the temperature sensor 220-$i$, the power switch 230-$i$, the accelerometer 240-$i$, and the gyroscope 250-$i$. For example, the temperature sensor 220-$i$ and the power switch 230-$i$ can be connected using an inter-integrated circuit ($I^2C$) bus. The heating element 210-$i$, the temperature sensor 220-$i$, the power switch 230-$i$, the accelerometer 240-$i$, and the gyroscope 250-$i$ can be placed on a flexible plate. The thickness of the polyamide can 50 micrometers. The flexible plate can be made of polyamide. The heating component 350-$i$ ($i=1, \ldots, N$) can be made in one technological cycle using the same technology as used for manufacturing flexible printed circuit boards.

The temperature sensor 220-$i$ may be in a thermal contact with heating element 210-$i$ and may be configured to provide data to the power switch 230-$i$ and the control plate 110. The data can be provided using an $I^2C$ circuit bus. The temperature sensor 220-$i$ may include an open-drain EVENT output used to indicate an alarm condition in which the measured temperature exceed a user-programmable pre-determined threshold. The pre-determined threshold can be set to 85 degrees of Celsius.

The power switch 230-$i$ can be operable to disconnect and connect the heating element 210-$i$ from a power source provided by the control plate 110. The power switch 230-$i$ may include a multichannel metal-oxide-semiconductor transistor. The power switch 230-$i$ can be connected directly to temperature sensor 220-$i$ to receive the indication of alarm condition. Upon receiving the indication of alarm condition, the power switch 230-$i$ can disconnect the heating element 210-$i$ from the power source. It should be noted that the power switch 230-*i* may disconnect the heating element 210-*i* from the power source solely based on the indication of alarm from the temperature sensor 220-*i* independently from any signals from the control plate 110.

The power switch 230-*i* may also be configured to receive further indications of alarms, for example, indication that amperage exceeded a predetermined value maximum. The further indications can be received from the control plate 110.

The accelerometer 240-*i* may include a 3-axis accelerometer. The accelerometer 240-*i* may provide data on proper acceleration of the heating element 130-*i*. The gyroscope 250-*i* can provide data on orientation and angular velocity of the heating component 130-*i*. The data from the accelerometer 240-*i* and gyroscope 250-*i* may be provided to control plate 110 via an I$^2$C bus.

Figure 3:
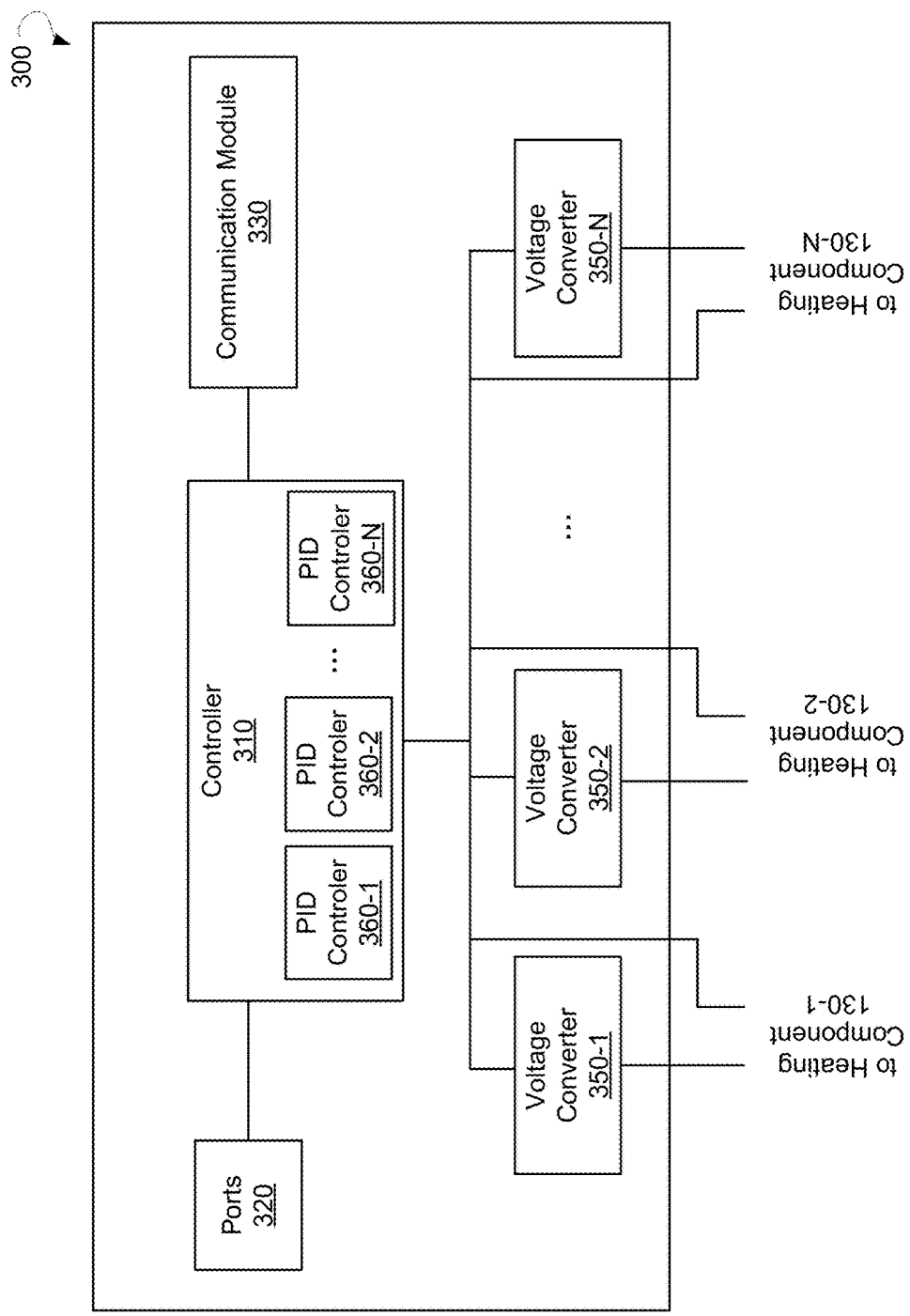
FIG. 3 is a block diagram of a control plate, according to some example embodiments of the present disclosure.

FIG. 3 is a block diagram of an example control plate 110. The control plate 110 may include a controller 310, one or more ports 320, a communication module 330, and one or more voltage converters 350-*i* (i=1, ..., N). The controller 310, communication module 320, voltage converters 350-*i* (i=1, ..., N) may be configured to receive power from the battery 120. The control plate 110 may be carried out as a printed circuit board made of a glass-reinforced epoxy laminate material, such as FR-4.

The controller 310 may include a system-on-chip, system-on-modules memory, an application-specific integrated circuit, and so forth. For example, the controller 310 may include an Advanced Reduced Instruction Set Machine (ARM) microcontroller carried out on base of Cortex-M4 kernel, such as STM32F745. The controller 310 may include modules for controlling temperature heating components 130-*i* (i=1, ..., N) by changing output voltage of the voltage converters 350-*i* (i=1, ..., N). For example, the controller 310 may include one or more proportional-integral-derivative (PID) controllers 360-*i* (i=1, ..., N). The PID controllers 360-*i* (i=1, ..., N) can control output voltages of the voltage converters 350-*i* (i=1, ..., N) independently of each other.

Each voltage converter 350-*i* (i=1, ..., N) may be configured to provide power only to one of the heating elements 130-*i* (i=1, ..., N). The voltage converter 350-*i* (i=1, ..., N) may include an input port to receive, from the controller 310, a value for output voltage. The value for the output voltage can be received, by the voltage converter, via a serial peripheral interface (SPI) bus. The voltage converter 350-*i* (i=1, ..., N) may also have an output ports for reporting, to the controller 310, amperage and voltage used by heating component elements 130-*i* (i=1, ..., N). An I$^2$C bus can be used for reporting amperage and voltage to the controller 310.

The ports 320 may include PCB connectors. For example, Molex SlimStack™ Hybrid Power connectors, which have both both power and signal contacts, can be used. The ports 320 may be used to transfer power to the heating components 130-*i* (i=1, ..., N), the touchscreen input device 140, and other elements of the system 100. The ports 320 can be also used to receive and send data from temperature sensor 220-*i*, power switch 230-*i*, accelerometer 240-*i*, and gyroscope 250-I of each heating components 130-*i* (i=1, ..., N), the ambient temperature sensor 170, the proximity sensor 150, and the touchscreen input device 140. The ports 320 may be also used to connect the control plate 110 to the battery 120.

The controller 310 can be configured to receive, via the ports 320, an ambient temperature from the ambient temperature sensor 170. The controller 310 can be also configured to receive user-defined temperatures for one or more heating components 130-*i* (i=1, ..., N) from the touchscreen input device 140 via the ports 320 or from the mobile device 180 via communication module 330, using a wireless protocol.

The controller 310 may be further configured to adjust an output voltage of the voltage converters 350-*i* (i=1, ..., N) based on the user-defined temperatures, the ambient temperature, and the temperature from the temperature sensor 220-*i*. By controlling the output voltage of voltage converter 350-*i* (i=1, ..., N), the controller 310 may control temperature of heating element 210-*i* of the corresponding heating component 130-*i* (i=1, ..., N). Since the heating components 130-*i* (i=1, ..., N) are provided with power from the voltage converters 350-*i* (i=1, ..., N) independently of each other and temperature sensors of heating components provide data to the controller 310 independently of each other, the controller 310 may independently control temperatures of the heating components.

Figure 4:
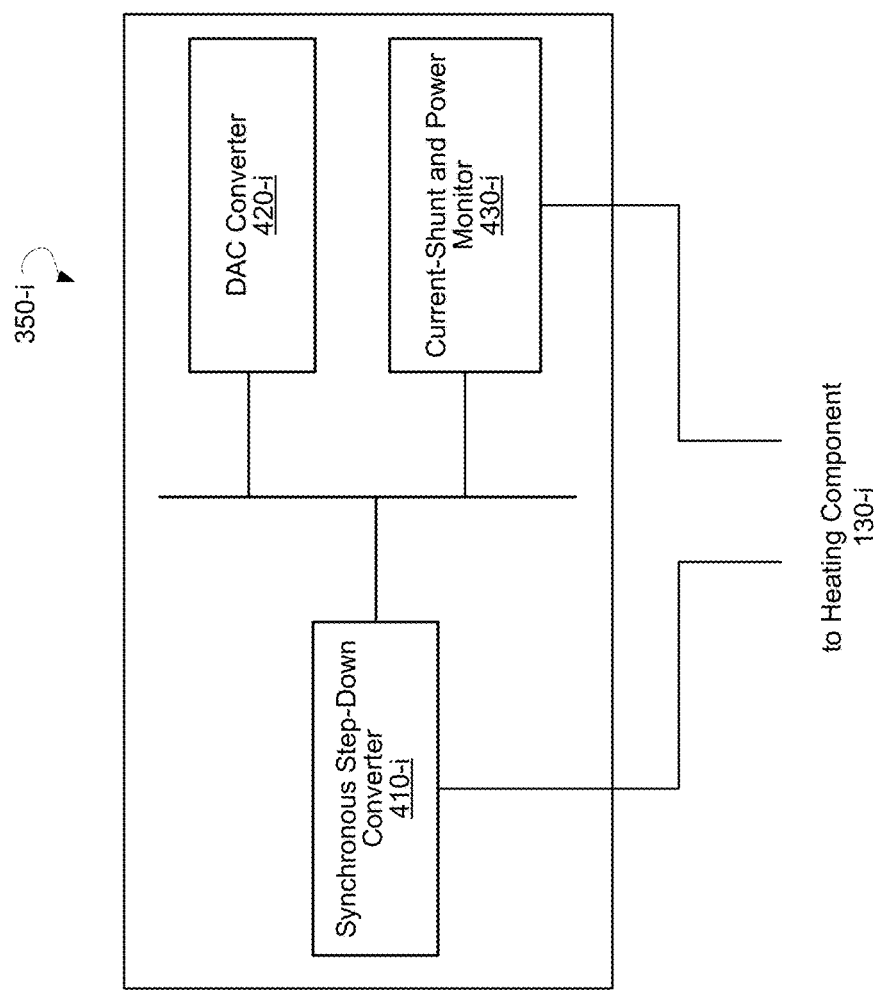
FIG. 4 is a block diagram of a voltage converter, according to an example embodiment of the present disclosure.

FIG. 4 is a block diagram of an example voltage converter 350-*i* (i=1, ..., N), according to an example embodiment of the present disclosure. The voltage converter 350-*i* may include a synchronous step-down converter 410, a digital-to-analog (DAC) converter 420-*i*, and a current-shunt and power monitor 430-*i*.

The synchronous step-down converter 410-*i* can be used to regulate output voltage. The synchronous step-down converter 410 may operate at a switching frequency of 2.5 Megahertz. In some embodiments, synchronous step-down converter TPS62135 of Texas Instruments can be used.

The DAC converter 420-*i* can be used for setting required value for the output voltage. In some embodiments, DAC081S101 8-Bit Micro Power Digital-to-Analog Converter of Texas Instruments can be used as the DAC converter 420-*i*.

The current-shunt and power monitor 430-*i* can be used to monitor amperage and voltage consumed by heating element of heating component 130-*i*. The current-shunt and power monitor 430-*i* may include an output port to report the amperage and the voltage to the controller 310. The current-shunt and power monitor 430-*i* may also include an output for indication of an alarm condition in which the monitored amperage exceed a user-programmable pre-determined limit. The output from the current-shunt and power monitor 430-*i* may be directly connected to the power switch 230-*i* of the heating component 130-*i*, so the power switch 230-*i* may disconnect the heating element 210-*i* from the corresponding voltage converter when the amperage exceeds the pre-determined limit without involving the controller 310. The output of the of the current-shunt and power monitor 430-*i* may be connected with the open-drain EVENT output of the temperature sensor 220-*i* using an OR gate, so the power switch 230-*i* may receive indications on alert conditions via one input. In some embodiments, INA231 current-shunt and power monitor of Texas Instruments can be used.

It should be noted, that usage of a synchronous step-down converter for regulating voltage provided to a heating element may have several advantages over power regulation using pulse width modulation. Using the step-down convert may help to avoid large impulse currents running through heating elements, which may cause high electromagnetic interference with the control plate 210, or external devices used by user who wears the heated clothing. The external device may include wearable devices, pacemaker, earphones, hearing aid, and the like. Usage of the step-down converter may also allow to minimize input and output circuits used on the control plate 110, which additionally decease level of the electromagnetic interference caused by heated clothing.

Figure 5:
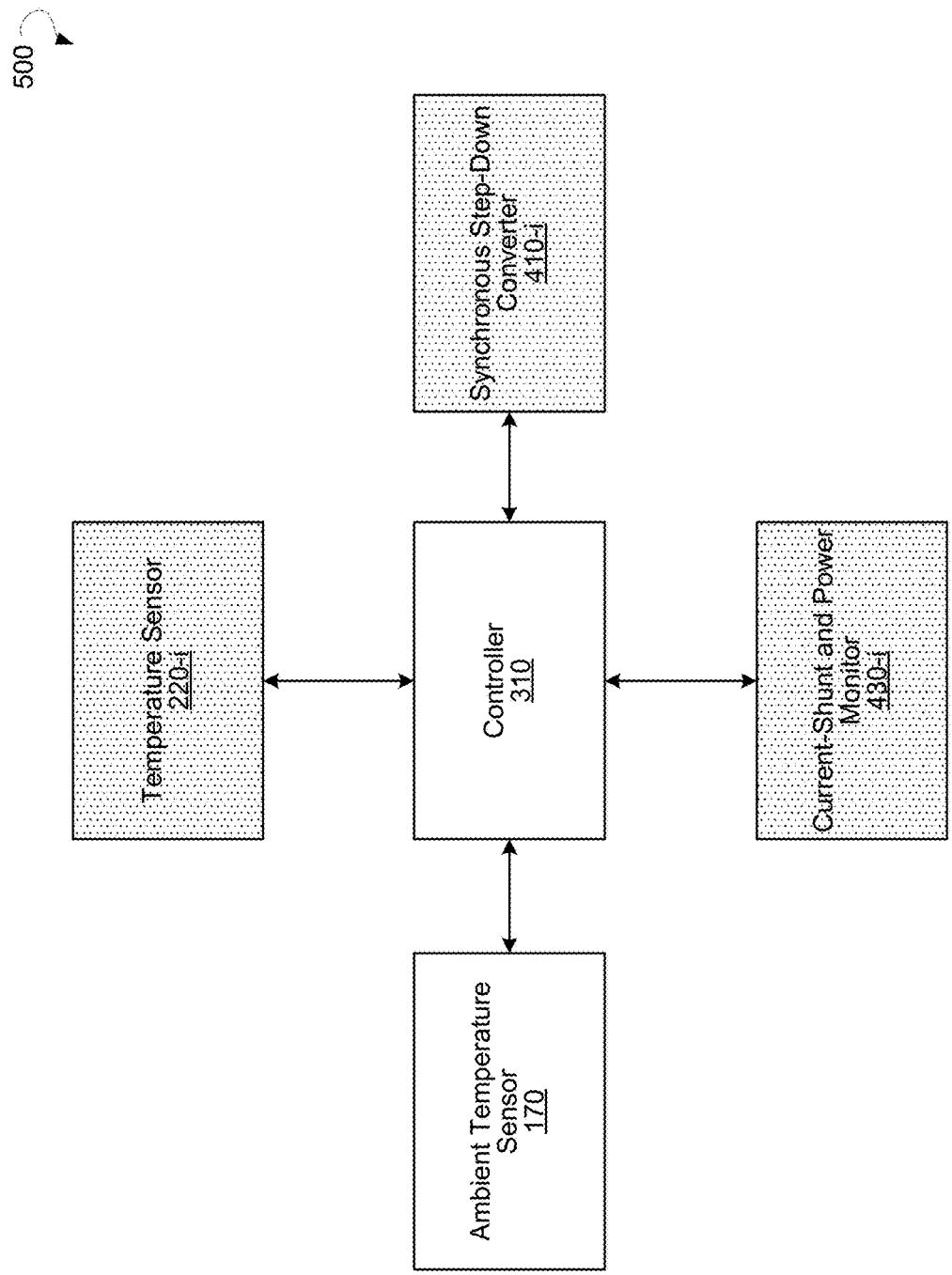
FIG. 5 is a block diagram showing a system for controlling heating components, according to an example embodiment.

FIG. 5 is block diagram showing a system 500 for controlling heating components 130-$i$ ($i=1, \ldots, N$), according to an example embodiment. The system may include the controller 310, the ambient temperature sensor 170, and the temperature sensor 220-$i$, the synchronous step-down converter 410-$i$, and current-shunt and power monitor 430-$i$, wherein $i=1, \ldots, N$ and N is number of heating components in the system 500. The number N of the heating components can be limited by memory and computing resources of the controller 310.

The controller 310 can be configured to receive parameters of the heating components 130-$i$ ($i=1, \ldots, N$) and control temperatures of the heating components 130-$i$ ($i=1, \ldots, N$) independently of each other. The parameters of heating component 130-$i$ may include temperature of the heating component as provided by the temperature sensor 220-$i$. The parameters of the heating component may 130-$i$ include an electrical current and a voltage consumed by the heating component 130-$i$ as provided by the current-shunt and power monitor 430-$i$. The controller 310 can adjust the temperature of the heating component 130-$i$ by changing output voltage of the synchronous step-down converter 410-$i$ connected to the heating component 130-$i$.

The heating components 130-$i$ ($i=1, \ldots, N$) can be operable to provide, continuously, thermal impact on the body of a user wearing the heated clothing. To prevent user to accustom to the temperature of the heating element, the value of the thermal impact can be changed periodically. Thus, the system 500 may be configured to continuously measure the temperature of the heating components, ambient temperature and calculate, based on the temperature of heating component 130-$i$ and the ambient temperature, a change in voltage provided to the heating component 130-$i$. The system 500 may also be configured to provide a control of conditions of heating elements 210-$i$ of the heating components 130-$i$ ($i=1, \ldots, N$) to determine or predict failures of the heating elements 210-$i$.

When one or more of the heating components 130-$i$ ($i=1, \ldots, N$) malfunction, the controller 310 may stop providing power and controlling the broken-down heating components. The controller may distribute power provided to broken-down heating components to rest of the heating components 130-$i$ ($i=1, \ldots, N$).

The controller 310 may be further configured to receive data from proximity sensor 150. Based on the data form the proximity sensor 150, the controller may determine that the clothing is not worn by a user. The controller 310 may further reduce the output voltage of the voltage converters to a minimum value to save battery charge.

The controller 310 may be further configured to receive data form accelerometers 240-$i$ and gyroscopes 250-$i$ ($i=1, \ldots, N$) and determine, based on the data from the accelerometers and gyroscopes, a level of physical activity of a user wearing the heated clothing. The level of physical activity of the user can depend on whether user is standing, walking, running, makes movement with his hands or legs, and so forth. The controller 310 may further adjust the output voltage of the synchronous step-down converter 410-$i$ ($i=1, \ldots, N$) based on the level of activity. The more user active, the less power can be provided to the heating components 130-$i$ ($i=1, \ldots, N$), so the user may feel more comfortable when he walks, runs, exercising, or performing work. When the user remains standing for a pre-determined period of time, the controller 310 may provide more power to the heating components 130-$i$ ($i=1, \ldots, N$) to increase temperature of heating elements.

The controller 310 can be further configured to estimate resistance of heating element 210-$i$ of heating component 130-$i$ ($i=1, \ldots, N$). The resistance of the heating element 210-I can be estimated using temperature coefficient of resistance for material the heating element made of. For example, for copper the temperature coefficient for resistance is $3.8 \times 10^{-3}$ 1/K. Using the estimate for the resistance of the heating element, the controller 310 may be further configured to estimate an integral temperature of the heating component 130-$i$ ($i=1, \ldots, N$), which represents a temperature across the area covered by the heating element 210-$i$. The integral temperature may be used for additional control of the heating component 130-$i$ ($i=1, \ldots, N$) in situations when the temperature sensor 220-$i$ located at one spot within the heating component 130-$i$ reports a temperature value that exceeds the pre-determined maximum temperature for the heating component. Using the integral temperature, the controller 310 may further compare the integral temperature to a pre-defined maximum temperature for the heating component 130-$i$ ($i=1, \ldots, N$). If the integral temperature is less than the pre-determined maximum temperature, the controller may further configure the power switch 230 to connect the heating element to voltage converter 350-$i$ ($i=1, \ldots, N$) despite the indication of alert condition from the temperature sensor 220-$i$.

The controller 310 may be further configured to determine that the resistance of the heating element 210-$i$ of one or more of the heating components 130-$i$ ($i=1, \ldots, N$) is outside of pre-defined tolerance range for resistance. The tolerance range for resistance can be known at time of manufacturing of the heating element 210-$i$. The controller 310 can be further configured to disconnect the heating element 210-$i$ from power by setting output voltage of the voltage converter 350-$i$ to zero and/or by sending a signal to the power switch 230-I to disconnect the heating element 210-$i$ from power. The controller 310 can be further configured to send an alert regarding condition of the heating element to either touchscreen input device 140 or the mobile device 170.

Figure 6:
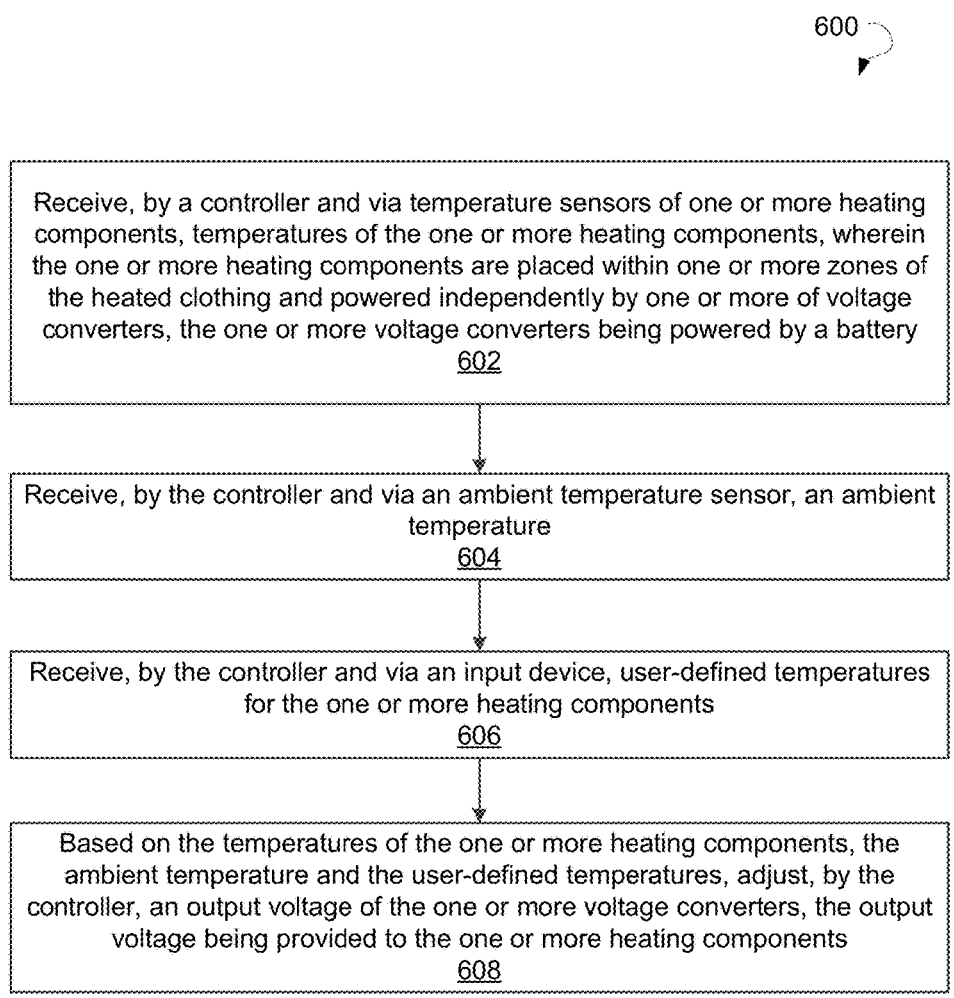
FIG. 6 is a flow chart showing a method for heating a heated clothing, according to an example embodiment.

FIG. 6 is a flow chart showing a method 600 for heating a heated clothing, according to an example embodiment. The method 600 may be implemented, using components of the heating system 100 as described in FIG. 1-4.

The method 600 may commence, in block 602, with receiving, by a controller and via temperature sensors of one or more heating components, temperatures of the one or more heating components. The heating components can be placed within one or more zones of the heated clothing. The heating components can be powered independently by one or more of voltage converters. The one or more voltage converters can be powered by a battery.

In block 604, the method 600 may include receiving, by the controller and via an ambient temperature sensor, an ambient temperature. In block 606, the method 600 may include receiving, by the controller and via an input device, user-defined temperatures for the heating components. In block 608, the method 600 may include, adjusting, by the controller, an output voltage of the one or more voltage converters based on the temperatures of the one or more heating components, the ambient temperature and the user-defined temperatures, wherein the output voltage is provided to the heating components.

Figure 7:
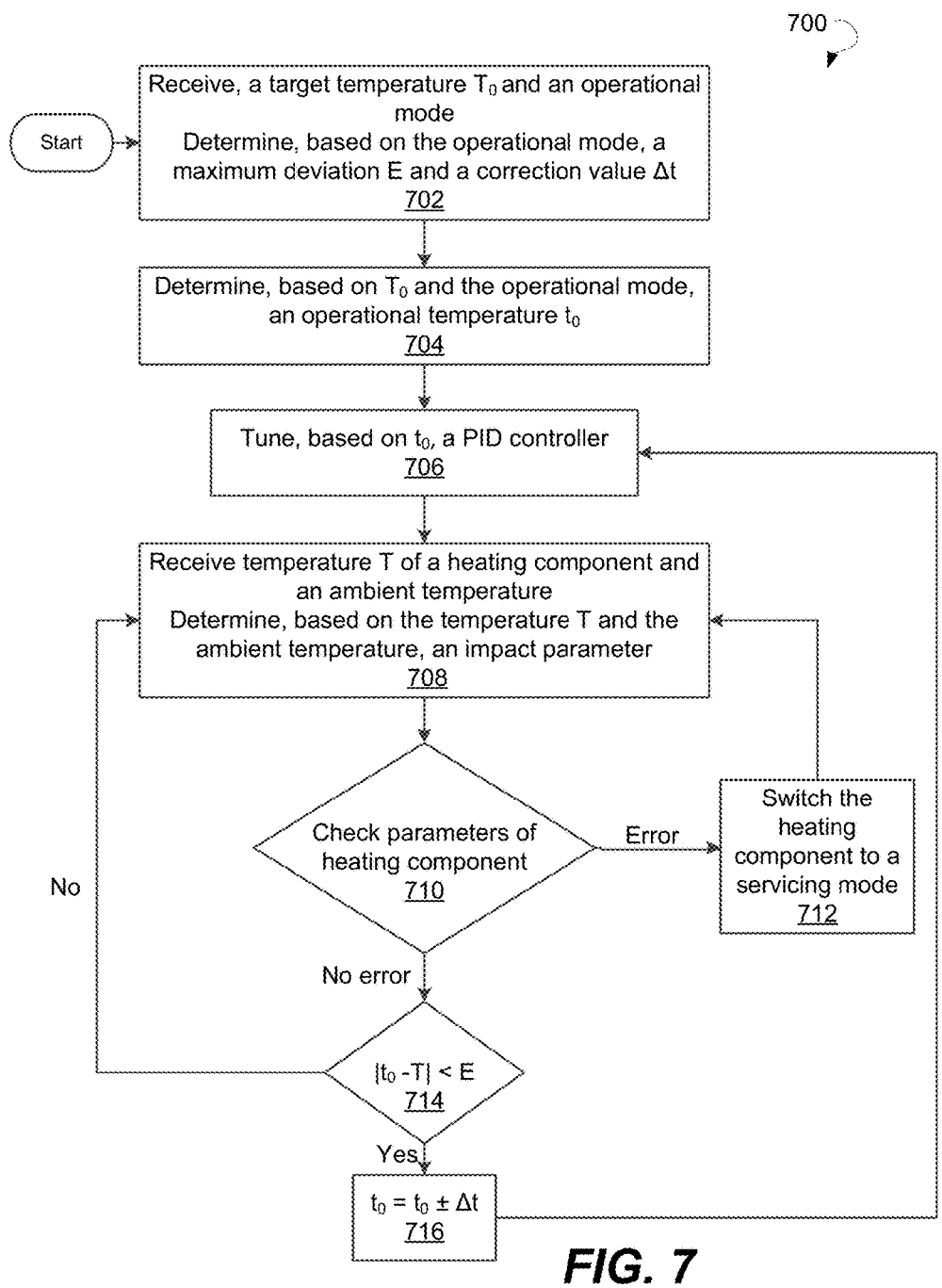
FIG. 7 is a flow chart showing a method for controlling a heating component, according to an example embodiment.

FIG. 7 is a flow chart showing a method 700 for controlling a heating component 130-$i$, according to an example embodiment. The method 700 may provide details for steps of the method 600 of FIG. 6.

The method 700 may commence in block 702, with receiving, by the controller 310, a target temperature $T_0$ and an operational mode for heating component 130-$i$. The target temperature $T_0$ and the operational mode can be set by a user, via the touchscreen input device 140 or the mobile device 180. If there is no user input, the target temperature $T_0$ and the operational mode can be set based on default values. The operational mode may include an automatic mode and an economical mode. The operational mode may further include indication on which heating components are selected to be heated. The operational mode may also include indication on geographical region and individual features of a user of heated clothing. The method 700 may further include determining, by the controller 310 and based on the operational mode, a maximum deviation E and a correction value $\Delta t$.

In block 704, the method 700 may include determining, by the controller 310 and based on the target temperature $T_0$ and the operational mode, an operational temperature $t_0$. In block 706, the method 700 may further include tuning, by the controller 310 and based on the operational temperature $t_0$, coefficients of the PID controller 360-$i$. The PID controller 360-$i$ can be configured to regulate output voltage of voltage converter 350-$i$ which is connected to the heating component 350-$i$.

In block 708, the method 700 may further include receiving, by the controller 310 and temperature sensor 220-$i$, a temperature T of the heating component 350-$i$. The method 700 may also include receiving, by the controller 310 and via the ambient temperature sensor 170, an ambient temperature. The method 700 may further include determining, by the controller and based on the temperature T and the ambient temperature, an impact parameter to be applied to output voltage of the voltage converter 350-$i$, wherein the output voltage is provided to the heating component 130-$i$.

In block 710, the method 700 may include checking parameters of heating components 350-$i$. Checking parameters may include determining whether temperature of the heating component does not exceed a pre-determined threshold. Indication that the temperature exceeds the pre-determined threshold can be provided by the temperature sensor 220-$i$. Though the power switch 230-$i$ is operable to disconnect the heating component 130-$i$ from the power provided by voltage converter 350-$i$ based only the indication of the temperature sensor 220-$i$, the controller 310 may additionally check if the temperature exceeds the pre-determined threshold. It may provide additional protection if the power switch 230-$i$ fails.

The controller 310 may also determine that electrical current and voltage consumed by the heating component are outside pre-determined ranges. The controller 310 may also estimate resistance of the heating component 130-$i$ and determined that the resistance outside a pre-determined tolerance range. If any of the parameters of heating component are outside of their safe ranges, it may indicate that the heating component 350-$i$ is not safe for use, so the result of the check is set to an error. The heating component 350-$i$ should be shut off to avoid short circuit.

In block 712, if the result of the check of the parameters of the heating component 130-$i$ is error, the method 700 may proceed with switching the heating component 350-$i$ to a servicing mode. When in servicing mode, the heating element 350-$i$ is not powered.

In block 714, if the result of the check if the parameters of the heating component 130-$i$ is not error, the method 700 may proceed with determining that deviation of the temperature T of the heating component 350-$i$ form the operational temperature $t_0$ does not exceed the maximum deviation E.

If $|t_0-T|<E$, the method 700 may proceed, in block 716, with correcting the operational temperature $t_0$ by correction value $\Delta t$. Since the operational temperature $t_0$ is corrected, the method 700 may proceed further, in block 706, with tuning the PID controller 360-$i$ based on the corrected operational temperature $t_0$.

If $|t_0-T|>=E$, the operational temperature $t_0$ remain unchanged. The method 700 may proceed further to the block 708.

Figure 8:
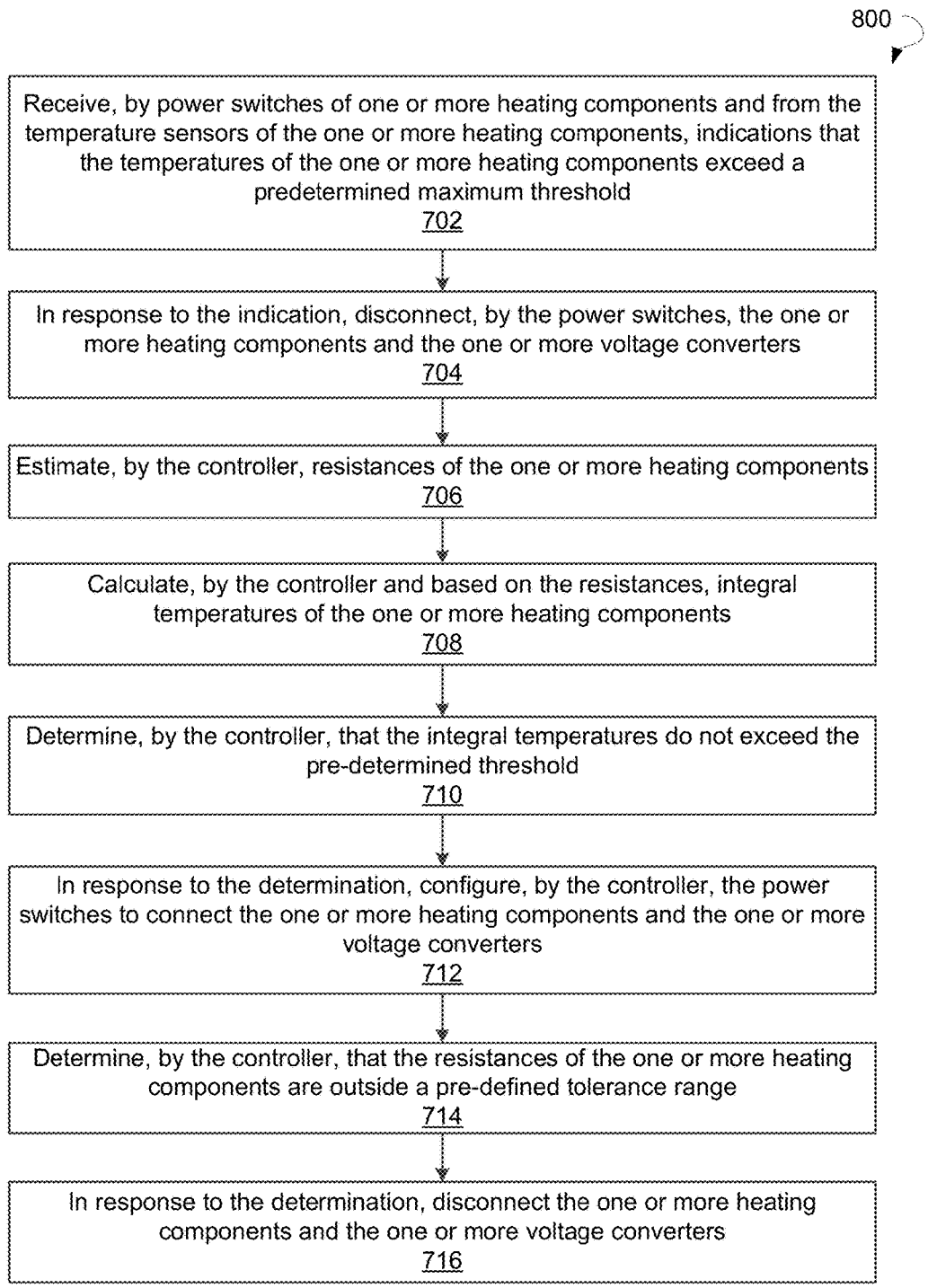
FIG. 8 is a flow chart showing a method for heating a heated clothing, according to an example embodiment.

FIG. 8 is a flow chart showing a method 800 for heating a heated clothing, according to an example embodiment. The method 800 may be a continuation of the method 600 of FIG. 6.

In block 802, the method 800 may include receiving, by power switches of the heating components from the temperature sensors of heating components, indications that the temperatures of the heating components exceed a predetermined maximum threshold. In block 804, in response to the indication, the method 800 may include disconnecting, by the power switches, the heating components and the voltage converters. In block 806, the method 800 may include estimating, by the controller, resistances of the heating components. In block 808, the method 800 may include calculating, based on the resistances, integral temperatures of the heating components.

In block 810, the method 800 may include determining, by the controller, that the integral temperatures do not exceed the pre-determined threshold. In block 812, the method 800 may include in response to the determination, configuring the power switches to connect the heating components and the voltage converters. In block 814, the method 800 may include determining that the resistances of the heating components are outside a pre-defined tolerance range. In block 816, the method 800 may include in response to the determination, disconnect the one or more heating components and the one or more voltage converters.

Figure 9:
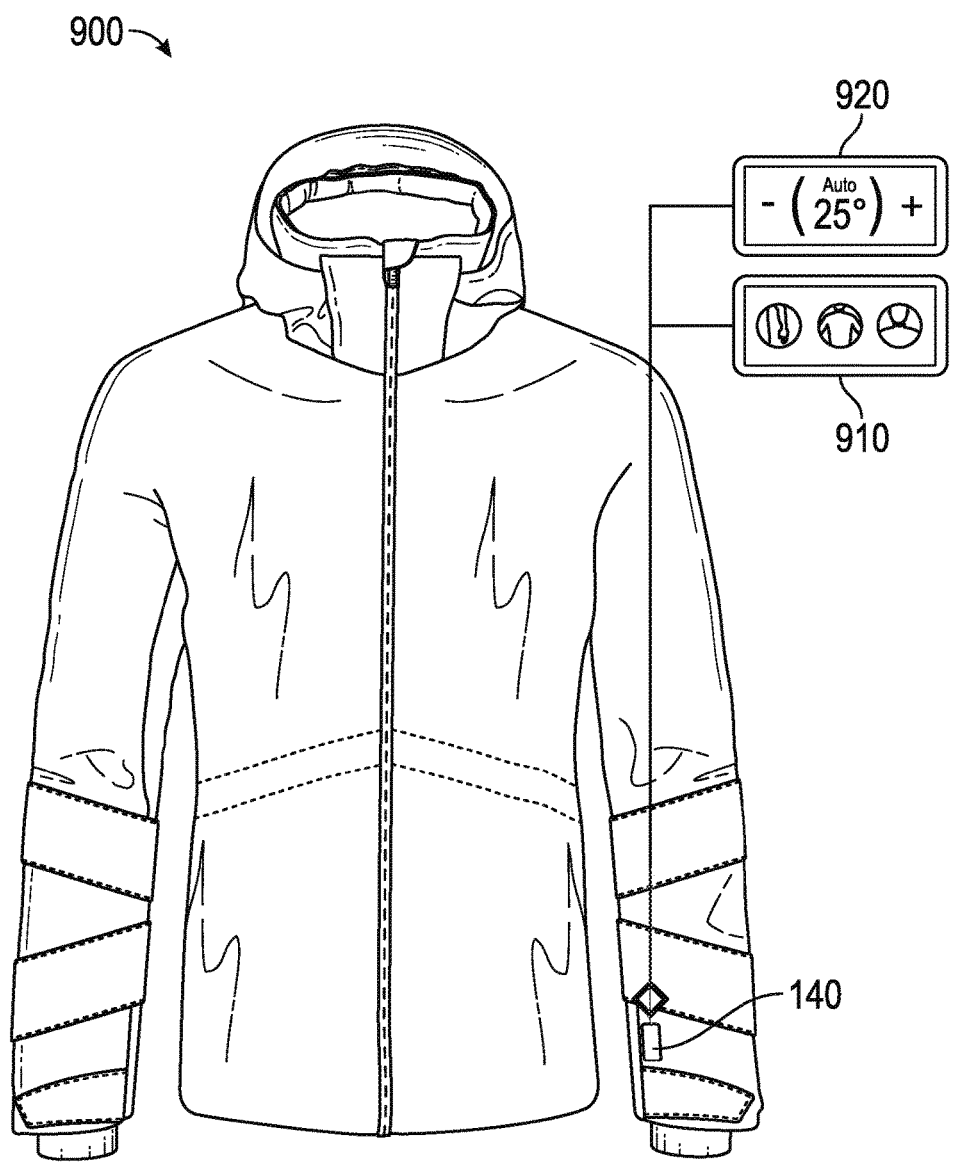
FIG. 9 shows a heated jacket, according to an example embodiment.

FIG. 9 shows a heated jacket 900, according to an example embodiment. The heated jacket 900 may include the touchscreen input device 140 located, for example, in a left sleeve. A user of the heated jacket 900 may use the touchscreen input device 140 to set operational mode of heating system 100 installed in the heated jacket 900. The user may also set a user-defined temperature for the heating components. Numerical 910 shows an example screen of the touchscreen input device 140. The screen 910 may allow the user to select one of the heating components located in one of the zones of the heated jacket 900. For example, the user may select a left arm, a right arm, a back, and a neck. Upon selecting the heating component, the user may be provided with screen 920. The screen 920 may show a temperature of the heating component. The screen 920 may also allow the user to touch either a minus sign or plus sign to set a user-defined temperature for the heating component.

Figure 10:
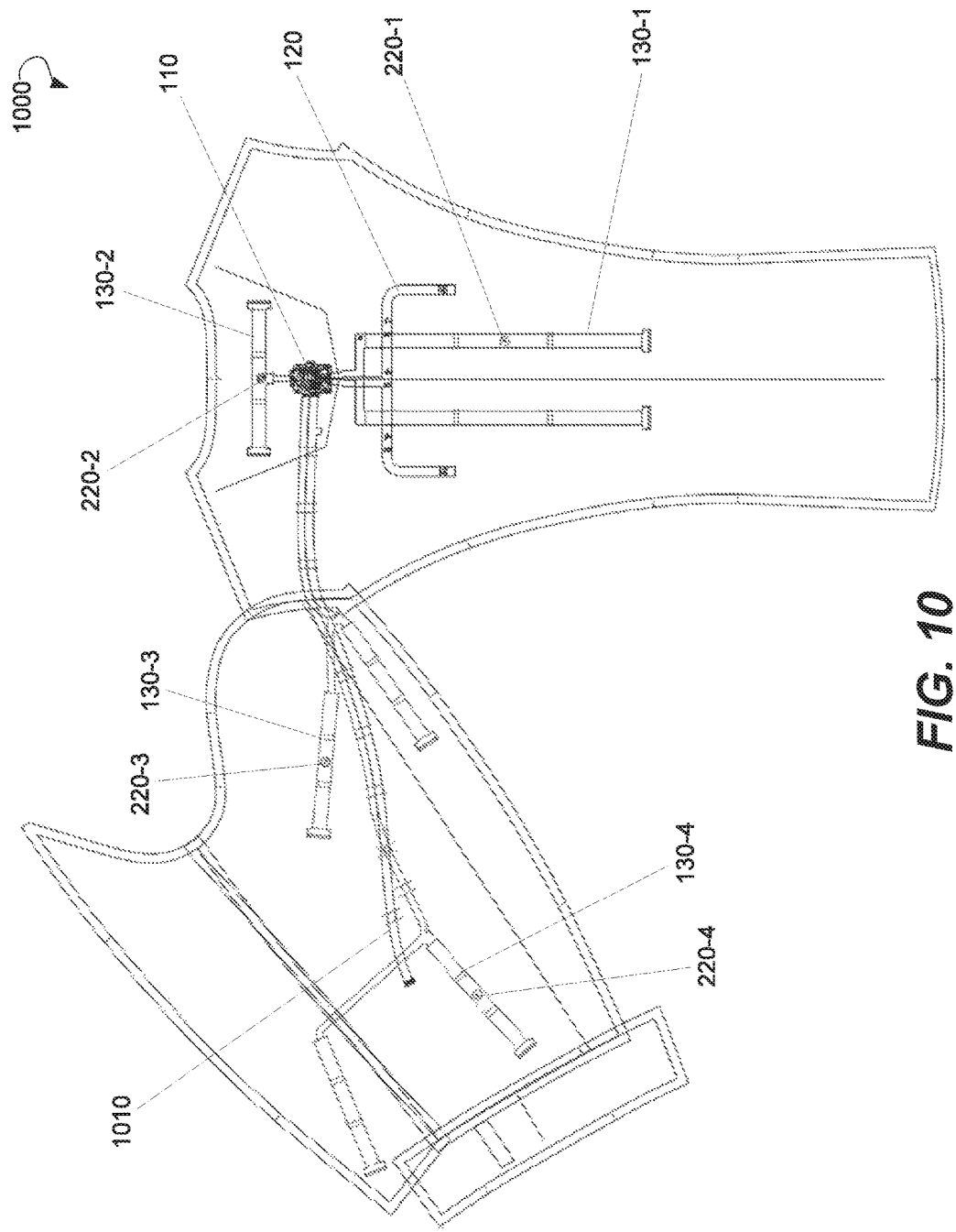
FIG. 10 is a schematic showing parts of the heated jacket, according to an example embodiment.

FIG. 10 is a schematic showing parts of the heated jacket 900, according to an example embodiment. The components of the heating system 100 can be installed in the jacket 900. The control plate 110 can be placed in zone of back of the heated jacket 900. Numerical 1010 depicts a strip connecting the control plate 100 and the touchscreen input device 140 (shown in FIG. 9). The strip 1010 may include communication buses for transferring data between the control plate 110 and the touchscreen input device 140.

Heating components 130-$i$ ($i=1, \ldots, 6$) can be installed in 6 zones. Heating component 130-1 can be installed in zone of back. Numerical 220-1 shows temperatures sensor of the heating component 130-1. The heating component 130-2 can placed in zone of neck. Numerical 220-2 shows temperatures sensor of the heating component 130-2.

The heating components 130-3 and 130-4 can be placed in the left sleeve, in zones of left shoulder and left arm. Numerical 220-3 shows temperatures sensor of the heating component 130-3. Numerical 220-4 shows temperatures sensor of the heating component 130-4. Correspondently heating components 130-5 and 130-6 (not shown in FIG. 10) can be placed in a right sleeve, in zones of right shoulder and right arm.

At 23 degrees of Celsius, heating elements of the heating components may have the following resistances: 3.7 Ohm for heating component 130-1 and 6.3 Ohm for other heating components 130-$i$ ($i=2, \ldots, 6$).

The battery 120 can be placed in the zone of back of the heated jacket 500. The battery 120 may include a flexible battery. The battery 120 may include 5 silver-zinc cells. Each of the cells may have operating voltage of 1.55 Volts and charging voltage of 2.05 Volts. Overall battery operating voltage does not exceed 7.55 Volts and overall battery charging voltage does not exceed 10.25 Volts. Maximum power of heating element of heating component 130-1 (in the zone of back) can be 16 Watts. Maximum power of heating element of heating component 130-2 (in the zone of neck) can be 10 Watts. Total power of heating elements of heating components installed in each shoulder and arm can be 10 watts.

The battery 120 may include a battery charge controller, for example BQ24773 of Texas Instruments. Charging of the battery 120 can be performed in a way that ensures an optimal condition for silver-zinc cells. The cells can be charged in parallel. Charging process includes a first mode when at the beginning of charging and a second mode at the end of charging. The first mode can be characterized by a constant current and the second mode can be characterized by a constant voltage. The voltage can be rigidly limited at the level of 2.05 Volts for each cells of the battery.

The battery charge controller may include a system power monitor and processor hot indicator. The battery charge controller may be configured to stop charging or discharging the battery when temperatures of any of cells exceeds a pre-determined value.

In one embodiment, the battery 120 may include a flexible battery. The flexible battery may include an anode layer, a cathode layer, and a separator layer. The layers can be covered with a polypropylene cover. The anode layer may include a copper plate, a matrix silk printed on the copper plate to form one or more cells, and anode active mass silk printed on the copper plate to fill the cells. The matrix can be made of an epoxy urethane polymer. The anode active mass can be made of a composition of silver, zinc hydroxide, and poly ethylene-vinyl acetate. The cathode layer may include a cooper plate covered with a zinc layer. The separator layer may be made of a microfiber poly ethylene impregnated with an electrolyte. The electrolyte may include a water solution of potassium hydroxide, lithium hydroxide, and potassium zincate.

Figure 11:
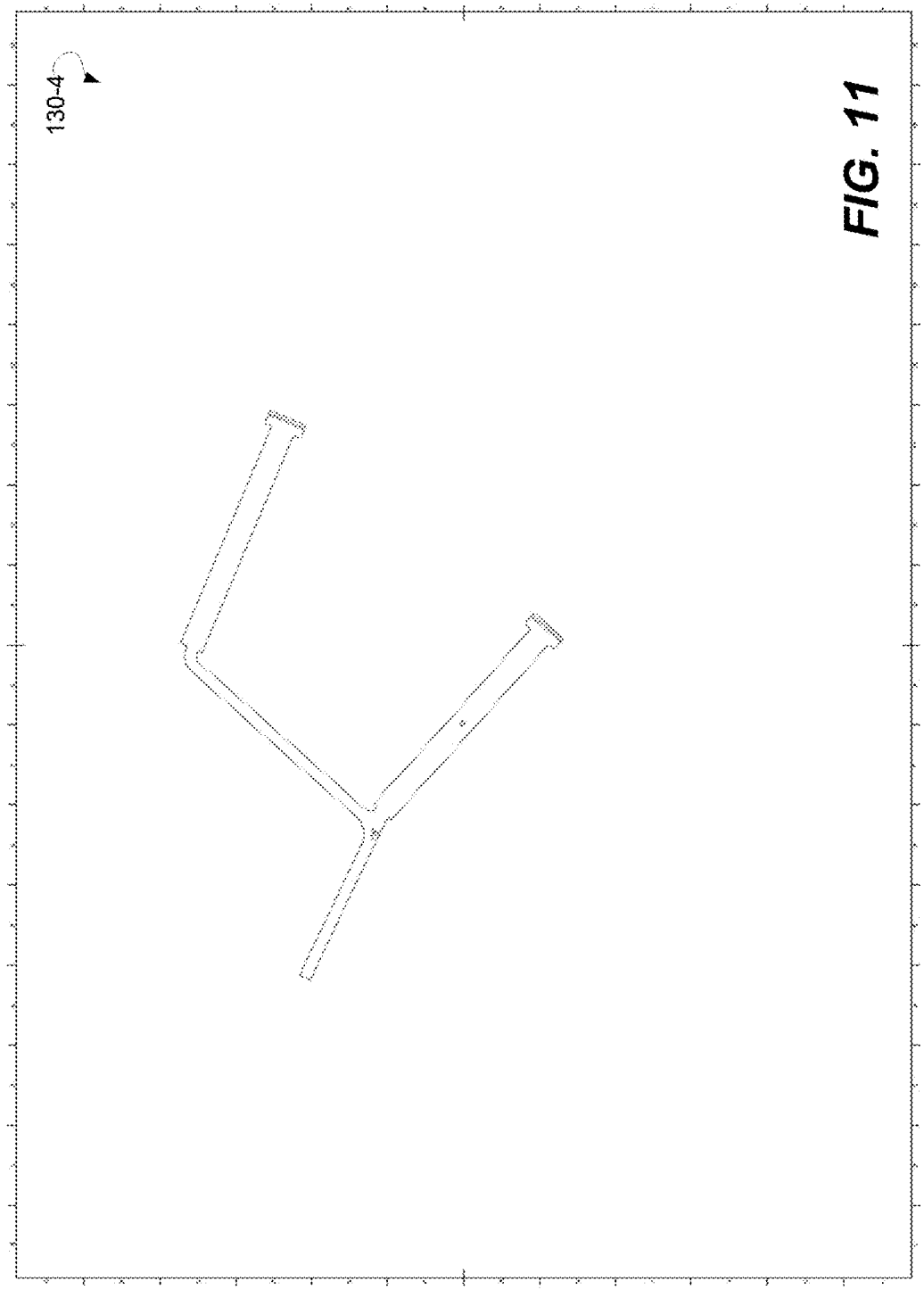
FIG. 11 is a technical drawing of example heating component to be placed in a zone of left arm of the heated jacket.

FIG. 11 is a technical drawing of example heating component 130-4 to be placed in a zone of left arm of the heated jacket 900.

Figure 12:
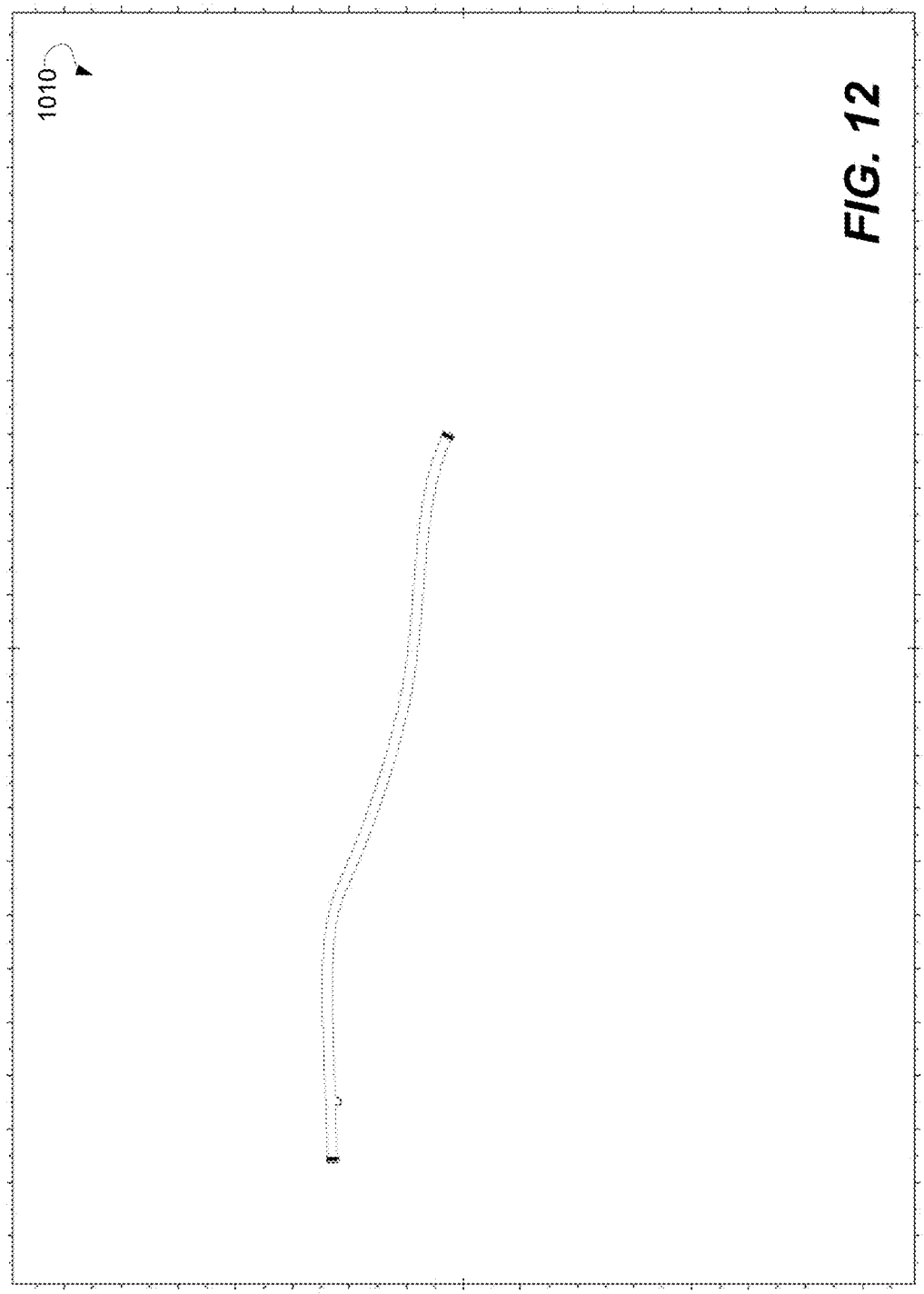
FIG. 12 is a technical drawing of an example strip connecting a control plate and a touchscreen input device in the heated jacket.

FIG. 12 is a technical drawing of an example strip 1010 connecting the control plate 110 and the touchscreen input device 140.

Figure 13:
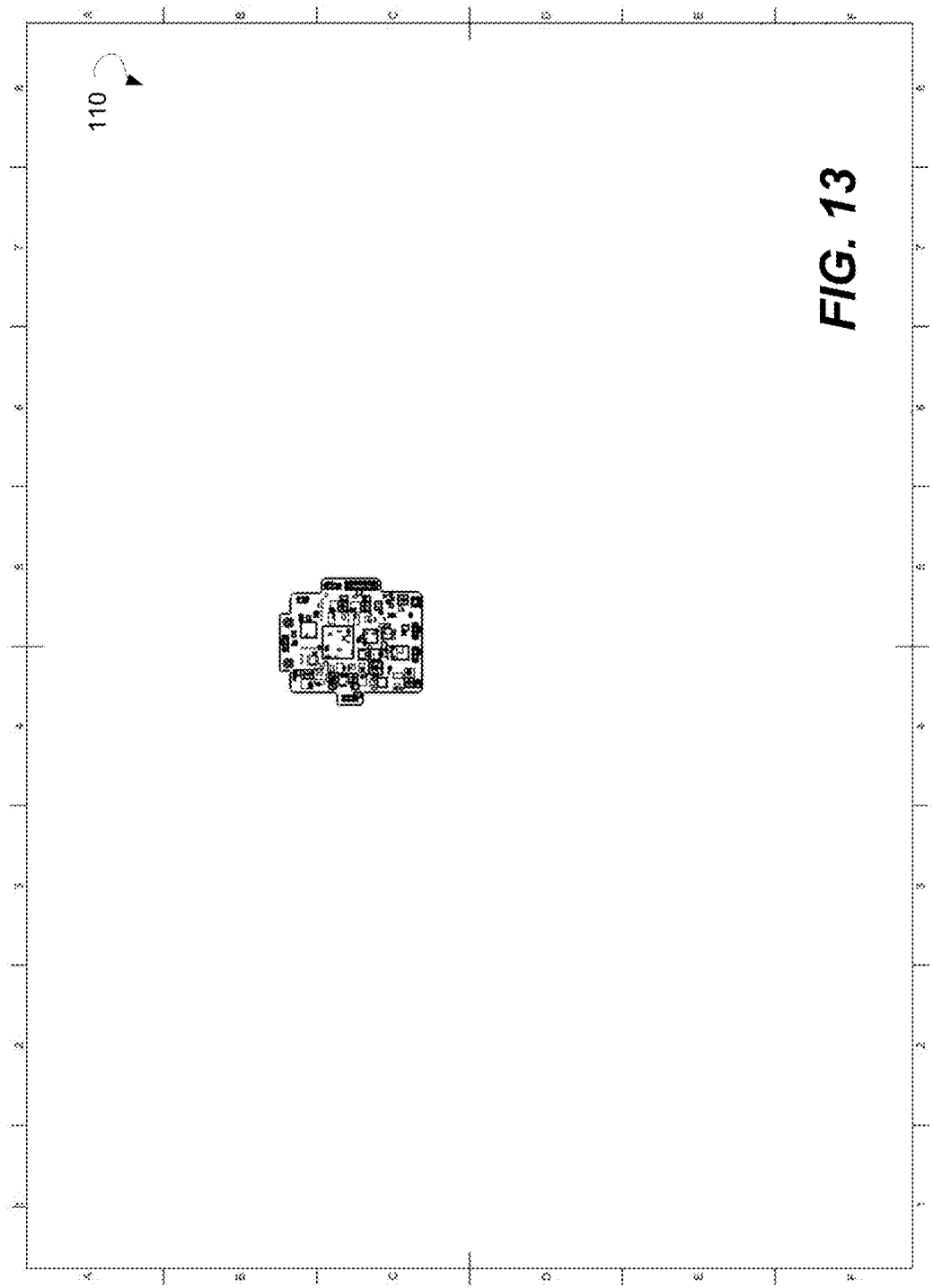
FIG. 13 is a technical drawing of example control plate to be placed in the back of the heated jacket.

FIG. 13 is a technical drawing of example control plate 110 to be placed in the back of the heated jacket 900.

Figure 14:
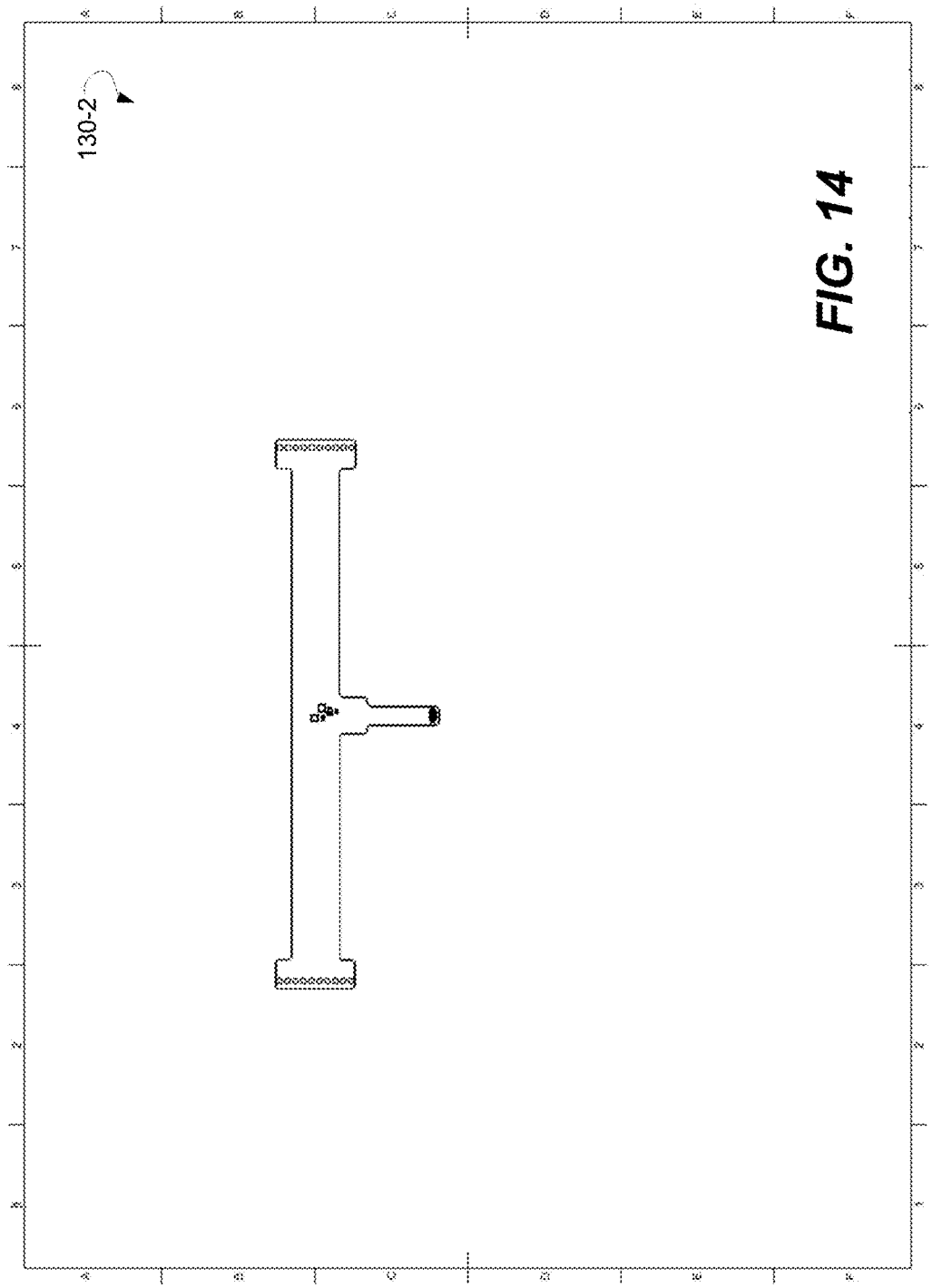
FIG. 14 is a technical drawing of an example heating component to be placed in a zone of neck of the heated jacket.

FIG. 14 is a technical drawing of an example heating component 130-2 to be placed in a zone of neck of the heated jacket 900.

Figure 15:
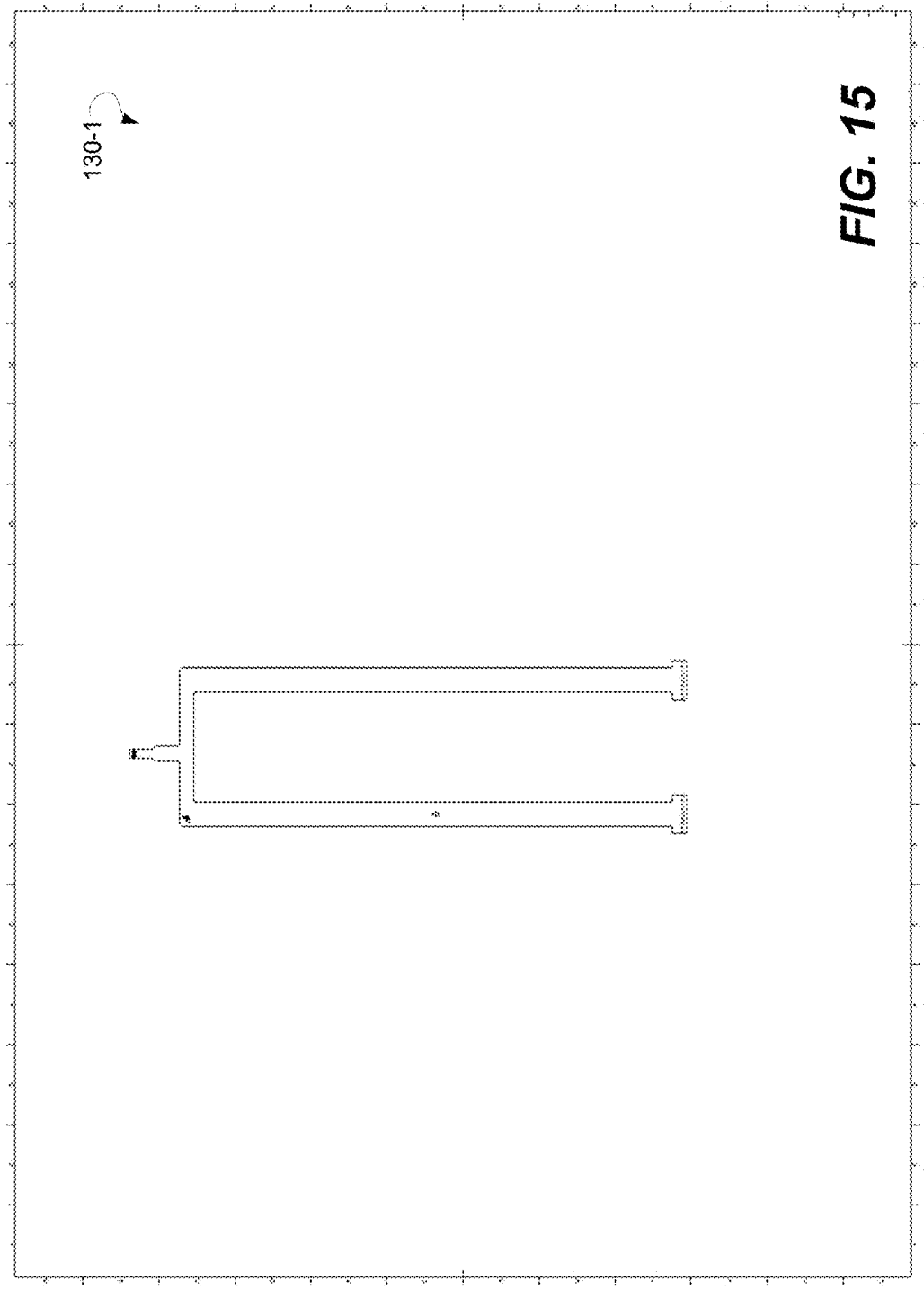
FIG. 15 is a technical drawing of an example heating component to be placed in zone of back of the heated jacket.

FIG. 15 is a technical drawing of an example heating component 130-1 to be placed in zone of back of the heated jacket 900.

Figure 16:
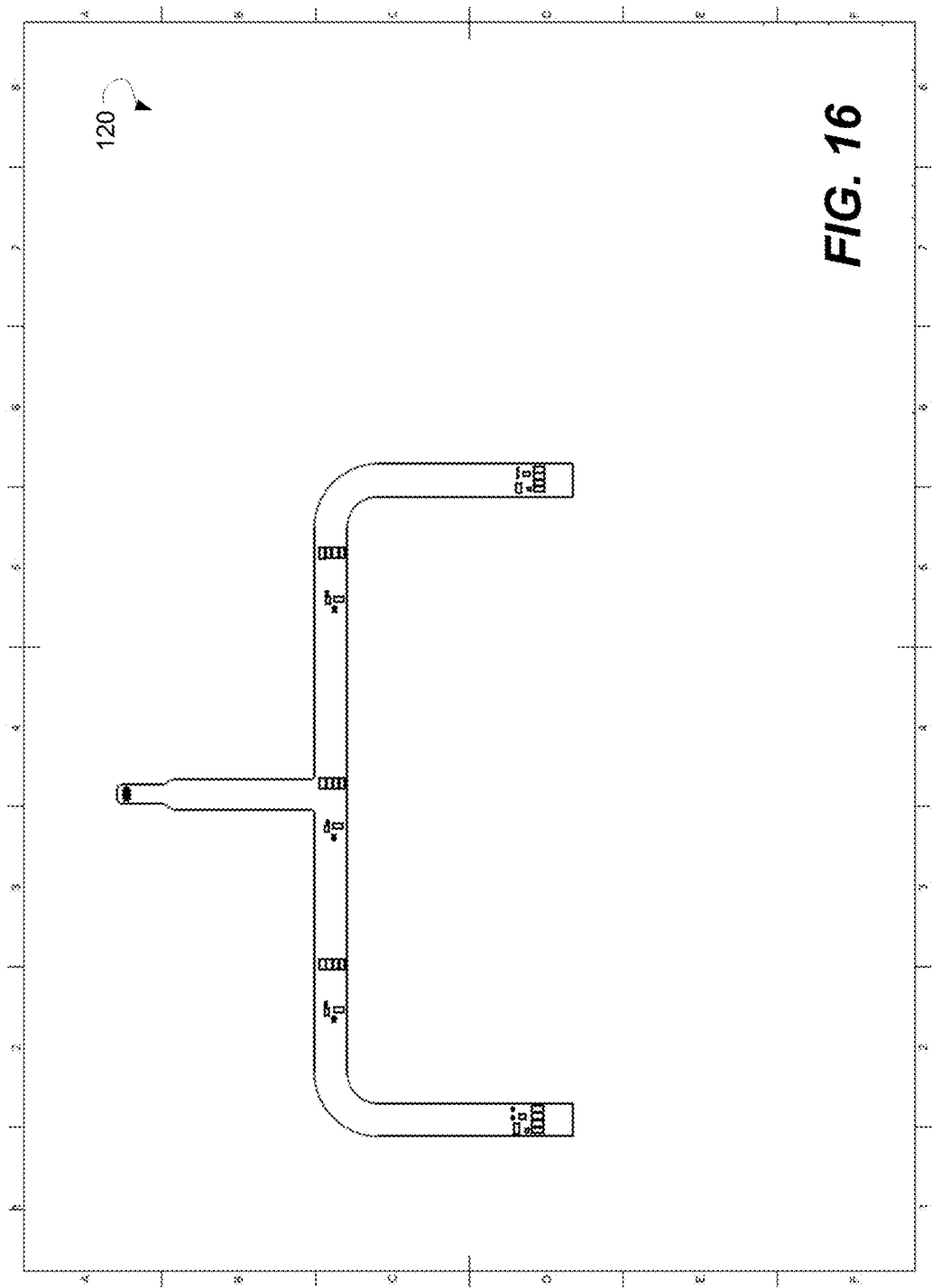
FIG. 16 is a technical drawing of an example flexible battery to be placed in zone of back of heated jacket.

FIG. 16 is a technical drawing of an example flexible battery 120 to be placed in zone of back of heated jacket 900.

Figure 17:
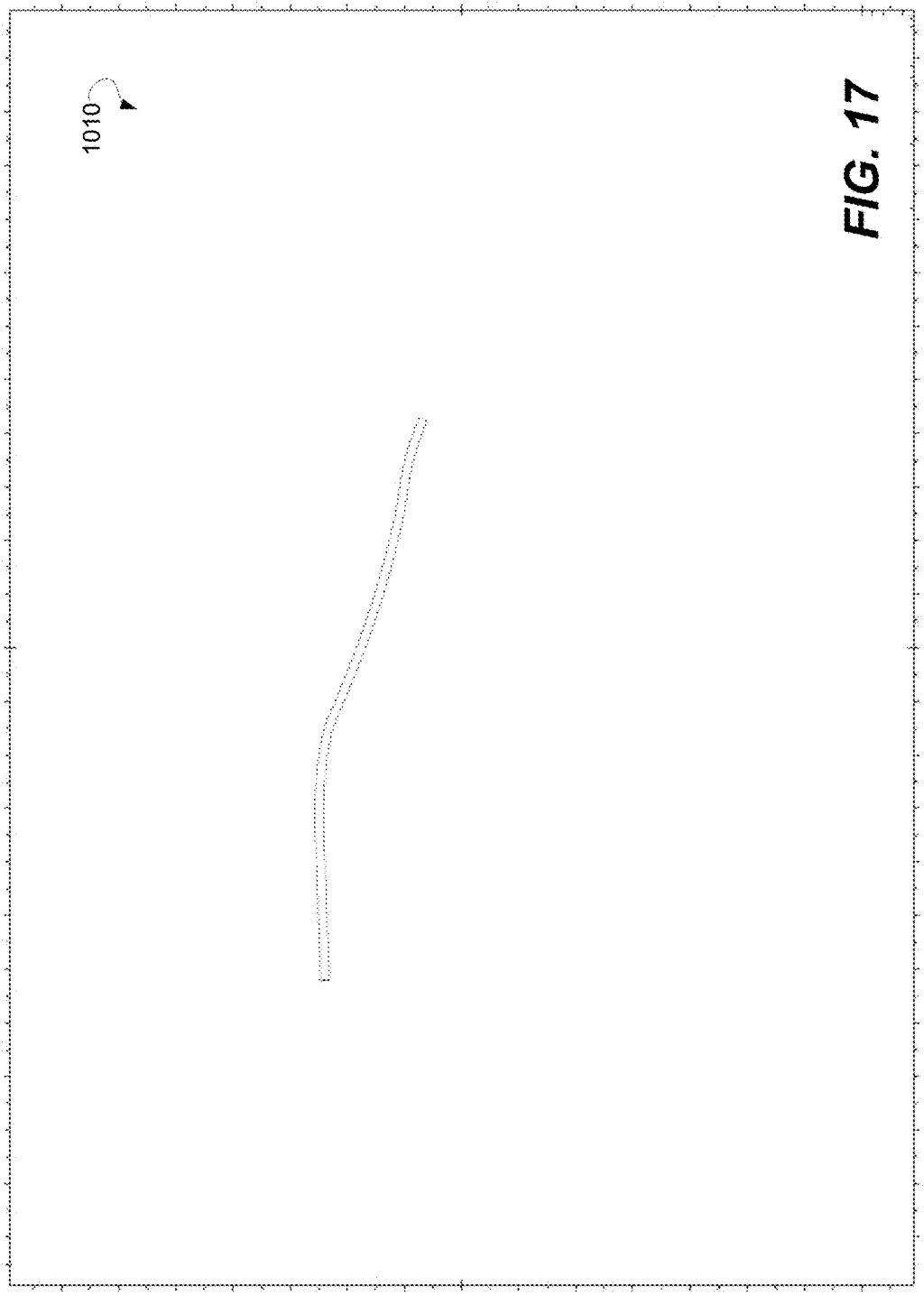
FIG. 17 is a technical drawing of an example strip connecting a control plate and a touchscreen input device in the heated jacket.

FIG. 17 is a technical drawing of an example strip 1010 connecting the control plate 110 and the touchscreen input device 140.

Figure 18:
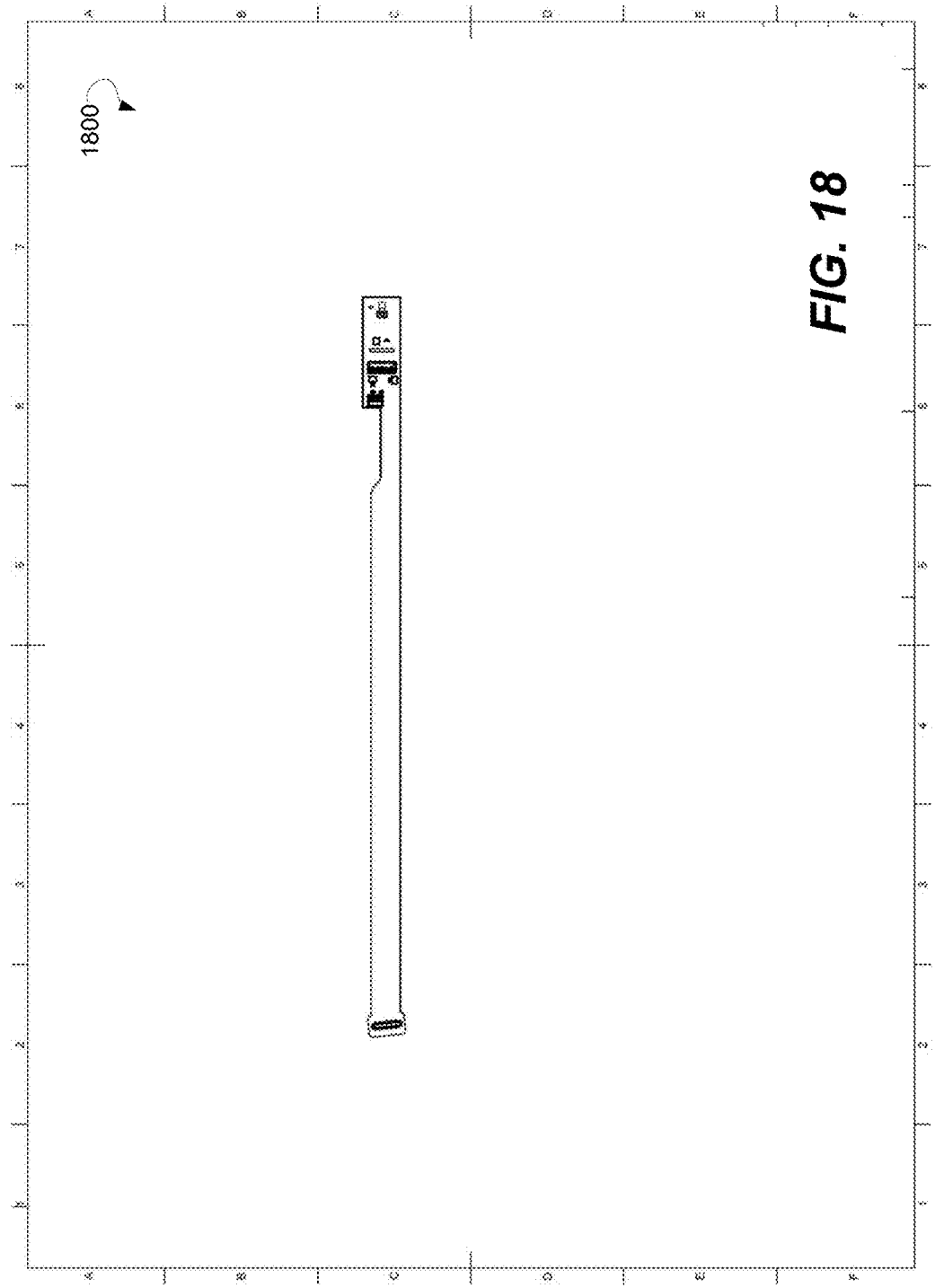
FIG. 18 is a technical drawing of an example touchscreen flexible plate in the heated jacket.

FIG. 18 is a technical drawing of an example touchscreen flexible plate 1080.

Figure 19:
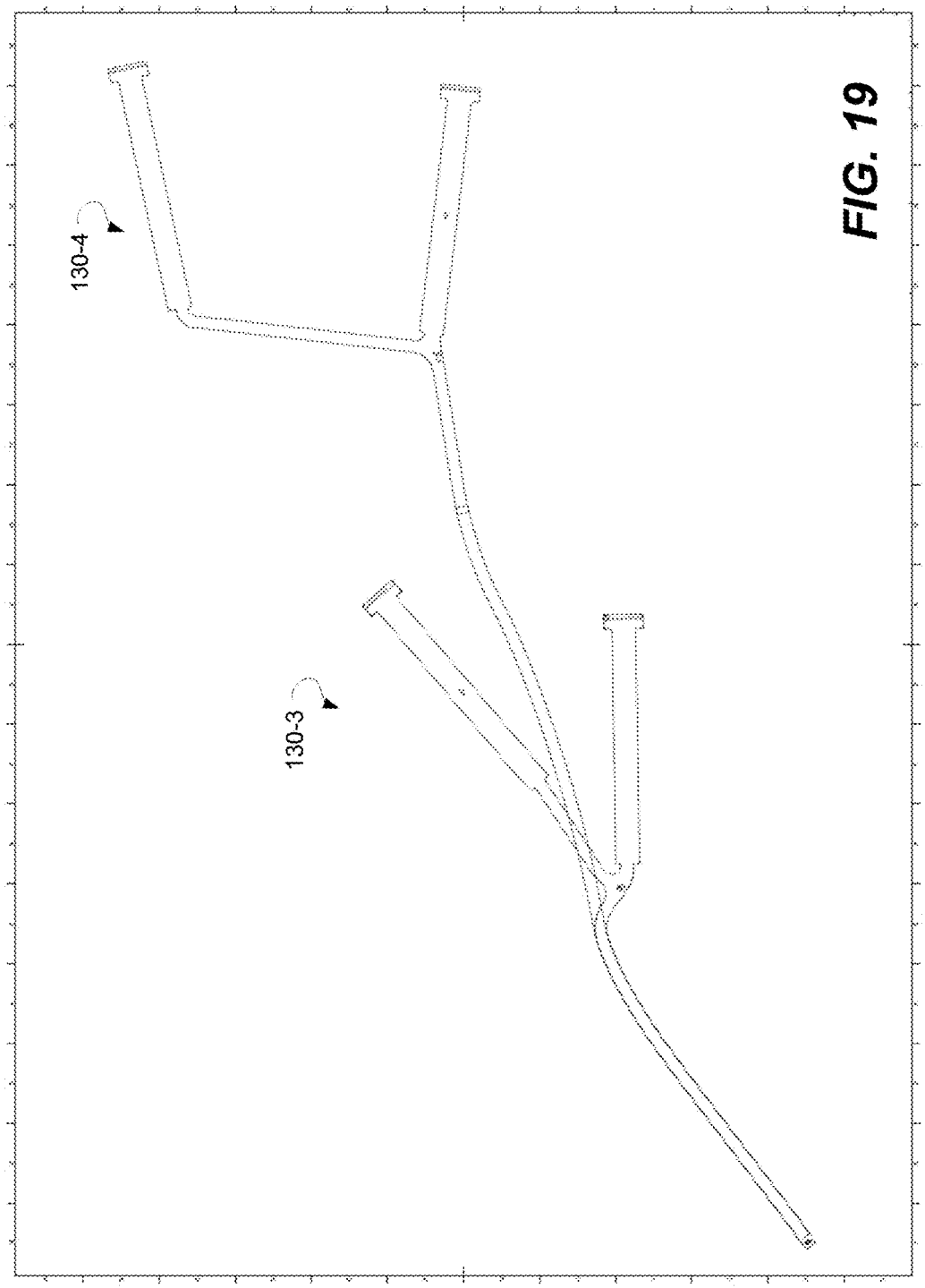
FIG. 19 is a technical drawing of an example heating components to be placed in zones of a left shoulder and left arm of the heated jacket.

FIG. 19 is a technical drawing of an example heating components 130-3 and 130-4 to be placed in zones of a left shoulder and left arm of the heated jacket 900.

Thus, the systems and methods for heating of heated clothing have been described. Although embodiments have been described with reference to specific example embodiments, it will be evident that various modifications and changes can be made to these example embodiments without departing from the broader spirit and scope of the present document. Accordingly, the specification and drawings are to be regarded in an illustrative rather than a restrictive sense.

What is claimed is:

1. A system for heating a heated clothing, the system comprising:
   one or more heating components placed within one or more zones of the heated clothing, the one or more heating components being configured to be individually connected to one or more voltage converters to receive an electrical current;
   a battery configured to provide power to the one or more voltage converters; and
   a controller configured to:
      connect or disconnect the one or more heating components and the one or more voltage converters; and
      adjusting an output voltage of the one or more voltage converters, the output voltage being provided to the one or more heating components, and by so regulating a temperature of the one or more heating components.

2. The system of claim 1, wherein:
   the temperature of the one or more heating components is regulated independently of a further temperature of a further heating components from the one or more heating components; and
   the one or more heating components is connected or disconnected from the one or more voltage converters independently of the further heating components from the one or more heating components.

3. The system of claim 1, wherein the battery is a flexible battery placed within the heated clothing.

4. The system of claim 1, wherein the one or more heating components comprise:
   a heating element to convert the electrical current into a heat;
   a temperature sensor configured to sense the temperature of the one or more heating components; and
   a power switch communicatively coupled to the temperature sensor and configured to:

receive, from the temperature sensor, an indication of the temperature exceeding a pre-determined temperature threshold; and in response to the indication, disconnect the one or more heating components and the one or more voltage converters.

5. The system of claim 4, wherein the one or more heating components is carried out as a flexible printed circuit board (PCB), the flexible PCB including a flexible basement made of a polyamide.

6. The system of claim 4, wherein the power switch and the temperature sensor are connected using an inter-integrated circuit bus and the power switch includes a multi-channel metal oxide semiconductor transistor.

7. The system of claim 4, further comprising:
an ambient temperature sensor communicatively coupled to the controller and placed within the heated clothing and configured to sense an ambient temperature; and
an input device communicatively coupled to the controller; and wherein the controller is configured to:
receive, from the ambient temperature sensor, the ambient temperature; and
to receive, via the input device, a user-defined temperature for the one or more heating components.

8. The system of claim 7, wherein the input device includes one of:
a touchscreen input device placed within the heated clothing; and
a mobile device connected to the controller using a wireless communication protocol.

9. The system of claim 7, wherein the controller is configured to:
receive, from the temperature sensor of the one or more heating components, the temperature of the one or more heating components; and
adjust the output voltage of the one or more voltage converters based on the ambient temperature, the user-defined temperature, and the temperature of the one or more heating components.

10. The system of claim 9, wherein the controller includes one or more proportional-integral-derivative controllers to adjust the output voltage of the one or more voltage converters.

11. The system of claim 4, wherein the power switch is configured to:
receive a further indication that a current flowing through the one or more heating components exceeds a pre-determined current threshold; and
in response to the determination, disconnect the one or more heating components and the one or more voltage converters.

12. The system of claim 11, wherein the controller is configured to:
estimate a resistance of the one or more heating components;
calculate, based on the resistance, an integral temperature of the one or more heating components;
determine that the integral temperature does not exceed the pre-determined threshold; and
in response to the determination, configure the power switch to connect the one or more heating components and the one or more voltage converters.

13. The system of claim 12, wherein the controller is further configured to:
determine that one of the following conditions is fulfilled:
the resistance of the one or more heating components is outside a pre-determined tolerance range; and the electrical current flowing through the one or more heating components exceeds a pre-determined maximum value; and
based on the determination, disconnect the one or more heating components and the one or more voltage converters.

14. The system of claim 1, further comprising a proximity sensor placed within the heated clothing, the controller being further configured to:
receive proximity data from the proximity sensor;
determine, based on the proximity data, that the heated clothing is not worn by a user; and
in response to the determination, set the output voltage of the one or more voltage converters to a pre-determined minimum value to conserve power of the battery.

15. The system of claim 1, wherein:
the one or more heating components further includes an accelerometer and a gyroscope, the accelerometer and gyroscope being communicatively connected to the controller; and
the controller being further configured to:
receive accelerometer data from the accelerometer and gyroscope data from the gyroscope;
determine based on the accelerometer data and gyroscope data, a level of activity of a user; and
adjust, based on the level of activity of the user, the output voltage of the one or more voltage converters.

16. The system of claim 1, wherein the one or more voltage converters include a synchronous step-down converter to regulate the output voltage provided to the one or more heating components.

17. The system of claim 1, wherein the one or more heating components are positioned to cover muscles of a user, when the heated clothing is worn by the user.

18. A method for heating a heated clothing, the method comprising:
receiving, by a controller and via temperature sensors of one or more heating components, temperatures of the one or more heating components, wherein the one or more heating components are placed within one or more zones of the heated clothing and powered independently by one or more of voltage converters, the one or more voltage converters being powered by a battery;
receiving, by the controller and via an ambient temperature sensor, an ambient temperature;
receiving, by the controller and via an input device, user-defined temperatures for the one or more heating components; and
adjusting, by the controller, an output voltage of the one or more voltage converters based on the temperatures of the one or more heating components, the ambient temperature, and the user-defined temperatures, the output voltage being provided to the one or more heating components.

19. The method of claim 18, further comprising:
receiving, by power switches of the one or more heating components and from the temperature sensor of the one or more heating components, indications that the temperature of the one or more heating components exceeds a predetermined maximum threshold;
in response to the indications, disconnecting, by the power switches, the one or more heating components from the one or more voltage converters;
estimating, by the controller, resistances of the one or more heating components;

calculating, by the controller and based on the resistances, integral temperatures of the one or more heating components;

determining, by the controller, that the integral temperatures do not exceed the pre-determined threshold;

in response to the determination, configuring, by the controller, the power switches to connect the one or more heating components and the one or more voltage converters;

determining, by the controller, that the resistances of the one or more heating components are outside a pre-defined tolerance range; and in response to the determination, disconnect the one or more heating components and the one or more voltage converters.

20. A system for heating a heated clothing, the system comprising:

one or more heating components placed within one or more zones of the heated clothing, wherein the one or more heating components include a temperature sensor and a power switch, the temperature sensor being configured to sense a temperature of the one or more heating components;

one or more voltage converters configured to provide power to the one or more heating components, the one or more voltage converters including a step-down converter to regulate an output voltage provided to the one or more heating components;

a battery configured to provide power for the one or more voltage converters;

an ambient temperature sensor placed within the heated clothing and configured to sense an ambient temperature;

an input device configured to receive, from a user, a user-defined temperature for the one or more heating components; and a controller configured to adjust a voltage of the one or more voltage converters based on the temperature of the one or heating components, the ambient temperature, and the user-defined temperature; and wherein the power switch is configured to:

receive, from the temperature sensor, an indication that the temperature of the one or more heating components exceeds a pre-determined maximum threshold; and in response to the indication, disconnect the one or more heating components from the one or more voltage source;

the controller being further configured to:

estimate a resistance of the one or more heating components;

calculate, based on the resistance, an integral temperature of the one or more heating components;

determine that the integral temperature does not exceed the pre-determined threshold;

in response to the determination, configure the power switch to connect the one or more heating components and the one or more voltage converters;

determine that the resistance of the one or more heating components is outside a tolerance range; and based on the determination, disconnect the one or more heating components and the one or more voltage converters.

* * * * *